(12) United States Patent
Williams

(10) Patent No.: US 11,687,842 B2
(45) Date of Patent: Jun. 27, 2023

(54) METHOD AND SERVER FOR PROVIDING FARE AVAILABILITIES, SUCH AS AIR FARE AVAILABILITIES

(71) Applicant: SKYSCANNER LIMITED, London (GB)

(72) Inventor: Gareth Williams, Edinburgh (GB)

(73) Assignee: SKYSCANNER LIMITED, London (GB)

(*) Notice: Subject to any disclaimer, the term of this patent is extended or adjusted under 35 U.S.C. 154(b) by 575 days.

(21) Appl. No.: 15/179,036

(22) Filed: Jun. 10, 2016

(65) Prior Publication Data

US 2016/0283869 A1 Sep. 29, 2016

Related U.S. Application Data

(63) Continuation of application No. PCT/GB2014/052846, filed on Sep. 18, 2014, and a
(Continued)

(30) Foreign Application Priority Data

Dec. 11, 2013 (WO) ................ PCT/GB2013/053261

(51) Int. Cl.
G06Q 10/02 (2012.01)
G06Q 30/0283 (2023.01)

(52) U.S. Cl.
CPC ......... G06Q 10/02 (2013.01); G06Q 30/0283 (2013.01)

(58) Field of Classification Search
CPC .... G06Q 10/02; G06Q 30/0283; G06Q 30/02; G06Q 10/00; G06F 17/00; G06F 17/60
See application file for complete search history.

(56) References Cited

U.S. PATENT DOCUMENTS 5,021,953 A * 6/1991 Webber ................ G06Q 10/025
705/6
5,615,109 A 3/1997 Eder
(Continued)

FOREIGN PATENT DOCUMENTS

FR 2841018 B1 5/2008
JP 2013015926 A 1/2013
(Continued)

OTHER PUBLICATIONS

Stefanescu, Catalina, "Multivariate Demand-Modeling and Estimation from Censored Sales", 2009 Management Science and Operations, London UK, pp. 1-33, 2009.
(Continued)

Primary Examiner — Rutao Wu
Assistant Examiner — Stephen S Swartz
(74) Attorney, Agent, or Firm — Saul Ewing LLP

(57) ABSTRACT

The field of the invention relates to methods, servers and computer program products for inferring which fare classes are available. There is provided a method of inferring fare class availability for a specific flight or flights by: (a) receiving observable, live bookable prices for that flight(s), in which that price information is not accompanied by complete fare class information for those flight(s); (b) comparing the observable, live bookable prices with a set of prices calculated from stored data, such as valid itinerary data, fare data such as FROP data, and tax/surcharge data; and (c) determining which fare class was used in the observable live bookable price by determining which fare class was used in the calculated price that matches most closely to the observable live bookable price.

20 Claims, 24 Drawing Sheets

Related U.S. Application Data continuation-in-part of application No. 14/103,016, filed on Dec. 11, 2013, now Pat. No. 11,030,635.

(56) References Cited

U.S. PATENT DOCUMENTS

| | | | |
|---|---|---|---|
| 5,712,985 A | 1/1998 | Lee et al. | |
| 6,388,592 B1 * | 5/2002 | Natarajan | H03M 7/30 341/107 |
| 7,212,975 B2 | 5/2007 | Bantz et al. | |
| 7,788,116 B2 | 8/2010 | Diflorio et al. | |
| 8,010,404 B1 | 8/2011 | Wu et al. | |
| 8,612,269 B2 | 12/2013 | Baggett et al. | |
| 8,874,477 B2 * | 10/2014 | Hoffberg | G06Q 40/04 705/37 |
| 10,387,833 B2 | 8/2019 | Swinson et al. | |
| 2001/0014868 A1 * | 8/2001 | Herz | G06Q 10/0637 705/14.38 |
| 2002/0116210 A1 | 8/2002 | Medina et al. | |
| 2002/0116348 A1 * | 8/2002 | Phillips | G06Q 30/02 705/400 |
| 2002/0194039 A1 | 12/2002 | Bhaskaran et al. | |
| 2003/0069747 A1 | 4/2003 | Strothmann et al. | |
| 2003/0217016 A1 | 11/2003 | Pericle | |
| 2005/0096963 A1 | 5/2005 | Myr et al. | |
| 2005/0149381 A1 * | 7/2005 | Ravulapati | G06Q 30/0283 705/400 |
| 2005/0228702 A1 * | 10/2005 | Fairbanks | G06Q 10/04 705/5 |
| 2005/0288973 A1 | 12/2005 | Taylor et al. | |
| 2006/0004613 A1 | 1/2006 | Roller et al. | |
| 2007/0055555 A1 | 3/2007 | Baggett et al. | |
| 2007/0150077 A1 * | 6/2007 | Bocharov | G06F 16/2465 700/29 |
| 2008/0126264 A1 * | 5/2008 | Tellefsen | G06Q 10/04 705/80 |
| 2008/0183512 A1 | 7/2008 | Benzinger | |
| 2008/0189148 A1 | 8/2008 | Diaz et al. | |
| 2008/0214154 A1 * | 9/2008 | Ramer | G06Q 30/06 455/414.1 |
| 2008/0243663 A1 | 10/2008 | Eveland | |
| 2009/0234710 A1 * | 9/2009 | Belgaied Hassine | G06Q 30/02 705/7.29 |
| 2010/0125486 A1 | 5/2010 | Sinclair et al. | |
| 2010/0179930 A1 | 7/2010 | Teller et al. | |
| 2010/0205038 A1 | 8/2010 | Rauser et al. | |
| 2010/0228574 A1 | 9/2010 | Mundringer et al. | |
| 2011/0071862 A1 | 3/2011 | Cator et al. | |
| 2012/0010913 A1 * | 1/2012 | Lele | G06Q 10/02 705/5 |
| 2012/0123909 A1 | 5/2012 | Kamenov et al. | |
| 2012/0303412 A1 * | 11/2012 | Etzioni | G06Q 30/06 705/7.31 |
| 2012/0310706 A1 * | 12/2012 | Nguyen | G06Q 10/02 705/7.31 |
| 2013/0073586 A1 * | 3/2013 | Aubry | G06F 16/2455 707/769 |
| 2013/0151289 A1 * | 6/2013 | Nivet | G06Q 10/02 705/5 |
| 2014/0006215 A1 | 1/2014 | Hornthal et al. | |
| 2014/0075004 A1 | 3/2014 | Van Dusen et al. | |
| 2014/0089020 A1 | 3/2014 | Murphy | |
| 2014/0100989 A1 * | 4/2014 | Zhang | G06Q 30/0283 705/26.61 |
| 2014/0149152 A1 | 5/2014 | Nickolson | |
| 2016/0283869 A1 * | 9/2016 | Williams | G06Q 30/0283 |
| 2019/0244230 A1 * | 8/2019 | Subramanian | G06N 7/01 |

FOREIGN PATENT DOCUMENTS

| | | | |
|---|---|---|---|
| JP | 2015520445 A1 * | 7/2015 | G06F 12/00 |
| WO | 2007014870 A2 | 2/2007 | |
| WO | WO2013160721 A1 * | 10/2013 | G06Q 10/06 |

OTHER PUBLICATIONS

Pindyck, Robert S., et al., "Microeconomics", 5th Ed., Prentice-Hall Inc, Upper Saddle River, NJ, pp. 20-24, 2001.

* cited by examiner $$\text{posterior} = \frac{\text{prior} \times \text{likelihood}}{\text{evidence}} \quad (1)$$

$$p(C|F_1,\ldots,F_n) = \frac{p(C)\, p(F_1,\ldots,F_n|C)}{p(F_1,\ldots,F_n)} \quad (2)$$

$$p(F_i|C, F_j) = p(F_i|C) \quad (3)$$

$$\text{classify}(f_1,\ldots,f_n) = \underset{c}{\arg\max}\, p(C=c) \prod_{i=1}^{n} p(F_i = f_i | C = c). \quad (4)$$

METHOD AND SERVER FOR PROVIDING FARE AVAILABILITIES, SUCH AS AIR FARE AVAILABILITIES

CROSS-REFERENCE TO RELATED APPLICATIONS

This application is a continuation-in-part of U.S. application Ser. No. 14/103,016, filed Dec. 11, 2013, and is a bypass continuation of International Application No. PCT/GB2014/052846, filed Sep. 18, 2014, which claims priority to International Application No. PCT/GB2013/053261, filed Dec. 11, 2013, and U.S. application Ser. No. 14/103,016, filed Dec. 11, 2013, the entire contents of each of which fully incorporated herein by reference.

BACKGROUND OF THE INVENTION

1. Field of the Invention

The field of the invention relates to methods, servers and computer program products for inferring which fare classes are available for a journey or service, such as for air fares, train fares, hotel prices, goods—in fact any type of goods or services whose prices are not fixed but instead are variable and it is therefore useful to be able to provide estimates for availabilities for fare classes.

2. Technical Background

Global Distribution Systems (GDS) gather schedules from OAG (Official Airline Guide: see e.g. www.oag.com), fares from ATPCO, and fare class availability from the airlines, and store this information in their own systems. This stored information is periodically updated from those sources. Running an availability query against such a GDS system can be slow, costs money and requires the use of energy to perform the searches and to transmit the results. Running an availability query against many airlines requires accessing multiple servers, which is also slow, and requires the use of energy to perform the search and to transmit the results.

Storing fare class availabilities for all possible routes between all possible airports for a sufficiently long time horizon (eg. 1 year) would require a very substantial data storage capacity.

3. Discussion of Related Art

FR2841018(B1) discloses a method for loading flight schedule modifications comprising the steps of: receiving at least one set of flight modifications; retrieval of individual modifications within the set and storage within a register for future scheduling; simulating reassignment of the reservations concerned by the flight schedule modification by accessing, via the reservation distribution server, both the records and flight schedule databases; and final updating of the flight schedule databases of the reservation inventory.

By way of example, in the context of airfare flight pricing, flight pricing is conventionally obtained from a GDS (see Section C for a more detailed explanation of how GDS systems work, and more generally about how flight pricing works). Flight comparison services, such as Skyscanner, and some airlines, pay a fee to obtain live, bookable prices from a GDS; these prices are the actual bookable prices that a potential passenger can book. However, many potential passengers are often just browsing and do not need definitively accurate bookable prices, but instead would be satisfied with an estimate. Consequently, it is very useful if an accurate price estimating method and system could be devised, especially if it removes the dependency on accessing third party resources, like a GDS, which not only cost money to access, but may not be available to provide the required information.

It is therefore desirable to provide a way of providing estimates of fare class availabilities between any two airports over a time period which is not as slow as accessing one or more remote servers many times to provide the estimates, and which requires less energy to provide the estimates of fare class availabilities, and which does not require the enormous data storage capacity needed to store results in advance for all possible queries.

SUMMARY OF THE INVENTION

According to a first aspect of the invention, there is provided a method of inferring fare class availability for a specific flight or flights by:

(a) receiving observable, live bookable prices for that flight(s), in which that price information is not accompanied by complete fare class information for those flight(s);

(b) comparing the observable, live bookable prices with a set of prices calculated from stored data, such as valid itinerary data, fare data such as FROP data, and tax/surcharge data; and (c) determining which fare class was used in the observable live bookable price by determining which fare class was used in the calculated price that matches most closely to the observable live bookable price.

An advantage is that the method does not require the time or energy required to access one or more remote servers many times to actually establish fare availability and to calculate fare prices so as to store results in advance for all possible queries. A further advantage is that the method does not require the enormous data storage capacity needed to store results in advance for all possible queries. A computer carrying out the method operates in a new way, and the perceived problems are overcome by the method. The method may be one wherein the stored data can be from cached, previously obtained live, bookable prices.

The method may be one wherein a fare class defines some or all of the applicable rules or restrictions applying to a specific fare for a specific flight or flights and include one or more of: class code, such as C (business full fare) or Y (economy full fare), fare type, such as first class or economy; categories, such as eligibility, minimum stay, stopovers, or penalties.

The method may be one wherein an inferred fare class price is included with each inferred fare class availability.

The method may be one wherein step (c) includes sending the inferred fare class availability to a server.

The method may be one wherein the server is an airline server.

The method may be one wherein step (b) includes using rules in order to analyse patterns in the set of prices calculated from stored data.

The method may be one wherein calculating the set of prices calculated from stored data in step (b) includes building a statistical model from historical prices, identifying missing quote candidates, and pricing quote candidates based on the statistical model.

The method may be one wherein inputs for the statistical model include reversed route equivalents.

According to a second aspect of the invention, there is provided a server configured to perform a method of any aspect of the first aspect of the invention.

According to a third aspect of the invention, there is provided a computer program product embodied on a non-transient storage medium, the computer program product when running on a computer arranged to infer fare class availability for a specific flight or flights, the computer program product when running on a computer arranged to:

(a) receive observable, live bookable prices for that flight(s), in which that price information is not accompanied by complete fare class information for those flight(s);

(b) compare the observable, live bookable prices with a set of prices calculated from stored data, such as valid itinerary data, fare data such as FROP data, and tax/surcharge data; and (c) determine which fare class was used in the observable live bookable price by determining which fare class was used in the calculated price that matches most closely to the observable live bookable price.

According to a fourth aspect of the invention, there is provided a method of inferring which fare classes are available, the method including the steps of:

(i) a computer server receiving a request for a price for goods or services, such as airfares, together with parameters defining those goods or services, (ii) configuring one or more processors to determine estimated prices from an incomplete historical price dataset by analysing patterns in that dataset, at any time with respect to step (i) above;

(iii) configuring one or more processors to calculate estimates for the requested price for the goods or services that satisfy the parameters;

(iv) sending the request to a Distribution System for fare prices;

(v) receiving from the Distribution System the Distribution System's fare prices;

(vi) comparing the calculated estimates for the requested price from step (iii) with the Distribution System's fare prices received in step (v) so as to infer fare class availability, and (vii) providing the inferred fare class availability to a computing device.

An advantage is that the method does not require the time or energy required to access one or more remote servers many times to actually establish fare availability and to calculate fare prices so as to store results in advance for all possible queries. A further advantage is that the method does not require the enormous data storage capacity needed to store results in advance for all possible queries. A computer carrying out the method operates in a new way, and the perceived problems are overcome by the method. Note that steps (ii) and (iii) in this method are not necessarily separate steps but may instead be part of the same step.

The method may be one wherein the parameters defining those goods or services include one or more of the following: activity type, such as airfare, hotel booking, train fare; date range; destination; origin; desired weather conditions; star ratings; keywords; any other user defined preference.

The method may be one wherein determination of estimated prices is performed by inferring, deriving or predicting estimated prices.

The method may be one wherein step (ii) comprises:

(a) obtaining historical price quotes from a computer data store;

(b) grouping the historical price quotes by category;

(c) deriving statistics for each group;

(d) storing on a computer for each group a classifier including the derived statistics, and (e) identifying groups with stored classifiers to which the requested prices corresponds.

The method may be one wherein step (iii) comprises: calculating a set of estimates for the requested price over a specified date range using statistics from the stored classifiers corresponding to the identified groups.

The method may be one wherein the Distribution System is a Global Distribution System.

The method may be one wherein an inferred fare class price is included with each inferred fare class availability.

The method may be one wherein step (vii) includes sending the inferred fare class availability to a server.

The method may be one wherein the server is an airline server.

The method may be one wherein step (ii) includes using rules in order to analyse patterns in the dataset.

The method may be one wherein step (ii) includes a naïve Bayes classifier machine learning approach which produces a probabilistic model of prices, and that model is used to predict unobserved prices.

The method may be one wherein classifiers are trained using observed prices and sets of features that correspond to them.

The method may be one wherein the features relate to the request, and include one or more of: departure day of week, length of stay, stay Saturday, airline, time to travel, route, month.

The method may be one wherein a classifier then predicts the price of an unobserved price by being given a set of features and providing a most likely price to have those features.

The method may be one wherein features may be derived by training multiple models with different features and comparing the predictive accuracy of the different models.

The method may be one wherein step (ii) includes building a statistical model from historical prices, identifying missing quote candidates, and pricing quote candidates based on the statistical model.

The method may be one wherein estimating prices for each candidate quote occurs in the following steps: extracting category feature values from the quote; retrieving from a database a classifier trained for an extracted category; extracting all feature values from the quote candidate; classifying the candidate quote by calculating Bayes posterior probabilities for each price range stored in a classifier and choosing a price range class with a highest Bayes posterior probability, and attaching a price class to a candidate quote.

The method may be one wherein inputs for the statistical model include: list of routes, classifier categorization scheme, historical quotes, and a set of supported features with weights.

The method may be one wherein historical quotes are filtered by age.

The method may be one wherein inputs for the statistical model include reversed route equivalents.

The method may be one including the step of: including cached fare prices in the set of price estimates.

The method may be one wherein the price is for a journey that is a one-way journey.

The method may be one wherein the price is for a journey that is a return journey.

The method may be one wherein the price includes an air fare price.

The method may be one wherein the price includes a train fare price.

The method may be one wherein the price includes a car hire price.

The method may be one wherein the price includes a hotel price.

The method may be one wherein the request comprises a flexible search request.

According to a fifth aspect of the invention, there is provided a server configured to perform a method of any aspect of the fourth aspect of the invention.

According to a sixth aspect of the invention, there is provided a computer program product embodied on a non-transient storage medium, the computer program product when running on a computer arranged to infer which fare classes are available, the computer program product when running on a computer arranged to:

(i) receive a request for a price for goods or services, such as airfares, together with parameters defining those goods or services, (ii) configure one or more processors to determine estimated prices from an incomplete historical price dataset by analysing patterns in that dataset, at any time with respect to (i) above;

(iii) configure one or more processors to calculate estimates for the requested price for the goods or services that satisfy the parameters;

(iv) send the request to a Distribution System for fare prices;

(v) receive from the Distribution System the Distribution System's fare prices;

(vi) compare the calculated estimates for the requested price from (iii) with the Distribution System's fare prices received in (v) so as to infer fare class availability, and (vii) provide the inferred fare class availability to a computing device.

According to a seventh aspect of the invention, there is provided a computer terminal in connection with a server of the second or fifth aspects of the invention, the computer terminal arranged to send a request defining a request for fare class availability for goods or services, such as airfares, together with parameters defining those goods or services, wherein the computer is further arranged to receive the outputted inferred fare class availability.

According to an eighth aspect of the invention, there is provided an item or a service, such as an airline ticket, and in which a fare class availability for that item or service is provided using a method according to the first or fourth aspects of the invention, or using a server according to the second or fifth aspects of the invention.

According to a ninth aspect of the invention, there is provided a web-based price comparison web site, with which end-users can interact by providing a request for fare class availability, and that web-based price comparison web site provides that request to a server that estimates the fare class availability using a method according to the first or fourth aspects of the invention.

BRIEF DESCRIPTION OF THE DRAWINGS

The above and other aspects of the invention will now be described, by way of example only, with reference to the following Figures, in which:

FIG. 3 shows examples of equations suitable for use in Naïve Bayes classification.

FIG. 10 shows an example of a user interface.

DETAILED DESCRIPTION

Figure 1:
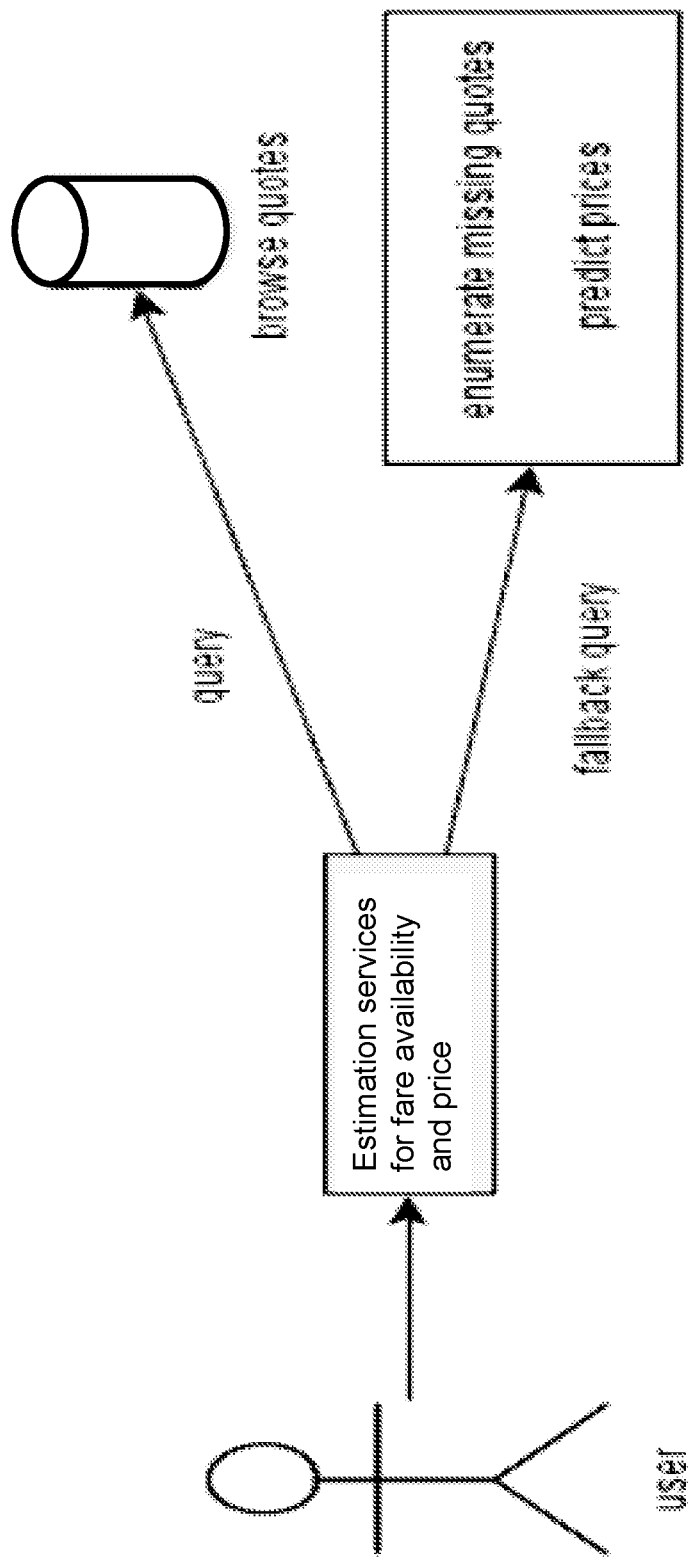
FIG. 1 shows an example of a system for estimating prices from other prices, with the purpose of using those prices to augment a cache of observed fares.

One implementation of the invention provides 'Model-Based Pricing'. It is described in section A below.

A. Model Based Pricing

There is provided flight price estimation using model based data interpolation.

Background/Motivation

The price of a ticket for an itinerary is complex to compute—it is the result of calculations of possible routings, qualifying fares, and the availability of those fares. These calculations are typically performed in a Global Distribution System (GDS), and running a query against such a system can be slow and also costs money.

Airlines that file fares in a GDS typically use a pricing model that we refer to as 'scheduled'. The key thing to note about such a model is that if there is a return trip departing on day $O_1$, and returning on day $R_1$, the price of a return ticket $P(O_1,R_1)$ is not equal to the sum of two single tickets $P(O_1)+P(R_1)$. The alternative pricing model, which we will call 'budget' pricing is one where $P(O_1,R_1)=P(O_1)+P(R_1)$.

Two important consequences of the scheduled pricing model are the limitations it puts on re-use of observed prices, and the space required to store them.

In a budget model, if two 'return' queries are made, one for dates $O_1$ $R_1$ and the other for dates $O_2$ $R_2$, the resulting prices $P(O_1)$, $P(R_1)$, $P(O_2)$, and $P(R_2)$ can be used to compute up to four return fares (i.e. $P(O_1,R_1)$, $P(O_1,R_2)$, $P(O_2,R_1)$, $P(O_2,R_2)$), as well as having the four fares for use in one-way queries ($P(O_1)$, $P(R_1)$, $P(O_2)$, and $P(R_2)$). If the query were run for a 'scheduled' model there would just be two fares i.e. $P(O_1,R_1)$ and $P(O_2,R_2)$. Thus in the budget model two queries enables us to answer eight queries, whereas in the scheduled model, two queries enables us to answer two queries.

Assuming that flight prices are only available for the current day and upcoming 364 days, all possible single and return fares on a route, can be found by performing 365 return queries. In the case of the scheduled model, there would need to be: $365*(365+1)/2=66,795$ return queries, as well as 365 single queries in each direction. Thus in order to build a complete list of prices for a route, the scheduled model requires about 185 times more queries than the budget model.

If one had the result of all those queries, there would necessarily be about 185 times the required storage space in order to the save the fares.

The above is just an example for a route between two defined airports. In practice there are about 5,000 commercial airports in the world. Hence number of possible journeys between the airports is about $(5,000)^2$. Taking into account the number $365*(365+1)/2=66,795$ of possible return queries described above, this leads to a total number of possible queries between all airports for a year of $(5,000)^2*365*(365+1)/2$, which is about $10^{12}$. The implied amount of data storage is very large indeed.

The massive increase in the number of queries needed to form a 'complete picture' of a scheduled model route combined with the costs of GDSs means that it is not practical (i.e. it is disadvantageous) to build such a cache. The result is then an incomplete cache, with 'holes' where fares have not been observed.

The prices, returned by the GDS, however, are the result of applying fare rules and availability. There are patterns and consistencies in the observed fares as a result. This example relies on using those patterns to allow us to interpolate the fares missing from the cache, using a model that reflects the fare rules that generated the prices in the first place.

System for Estimating Prices from Other Prices

There is provided a system for estimating prices from other prices, with a purpose of using those prices to augment a cache of observed fares (e.g. observed by users requesting prices for live bookable fares). An example model is shown in FIG. 1.

The estimator uses statistics derived from the quotes in order to predict other quotes. A very simple estimator could compute that all missing fares are equal to the average of all observed fares. The level of prediction can be improved by making the model more sophisticated, in order to take into account the type of rules used to generate the fares in the first place.

For example, a common 'rule' that defines whether a fare is valid for an itinerary is whether the itinerary involves staying on a Saturday night. Typically such rules mean that dates that involve not spending Saturday night at the destination are much more expensive—the rule is designed to penalize business travellers who usually desire to only be away during the work week. Thus a better model could be calculated that comprises two averages—the average of all observed fares that do involve a Saturday night stay, and the average of all the observed fares that do not involve a Saturday night stay. The algorithm would then predict prices for previously unobserved date pairs, by firstly calculating whether there was a Saturday night between the date pair, and then returning the corresponding average. This results in an estimate with increased accuracy.

Similar improvements can be made to the model—for example, the price of travel varies depending on the day of the week—Mondays are typically more expensive than Wednesdays, thus calculating and using averages that also take into account the day of week would also potentially improve the model accuracy.

Therefore a statistical model may be provided for predicting fares, using statistics and rules which may have been derived by a human, for example. An alternative method of producing the statistical model is also possible—this approach uses a machine learning approach called a 'Naïve Bayes classifier' to produce a probabilistic model of fares, and that model is used to predict the unobserved fares. The classifier is trained using observed prices and sets of 'features' that correspond to them. The features relate to the query that generated the fares, and could include: departure day of week, length of stay, stay Saturday, airline, etc. The classifier then predicts the price of an unobserved fare by being given a set of features and providing the most likely price to have those features.

The statistical model for predicting prices can then be consulted in order to predict previously unobserved fares, or observed fares in the event of wanting to measure the accuracy of the model.

Key Features and their Calculation

Features which may be used for training classifiers include:
   Stay Saturday
   Length of stay
   Day of week
   Time to travel
   Airline
   Web site
   Route
   Date—at day and year-month level
   Month These features have been derived by analysing all the fares listed in FROP (Fare Rule Output Product, from ATPCO (the Airline Tariff Publishing Company)) and determining which rules applied to the largest number of fares. For example, 54% of fares have a minimum stay rule, and 31% of all fares have a minimum stay rule requiring that Saturday night is spent at the destination. Therefore, the feature is likely to be a useful feature for classification on the basis of price. A more accurate estimate of the utility of features may be derived by training multiple models with different features and comparing the predictive accuracy of the different models.

Benefits
   Estimation of missing flight price data
   Using features related to the generation of data to produce
      a superior predictive model Potential Market(s) and/or Area(s) of Application The model may be used in the flight industry in order to estimate previously unobserved prices, in order to display them to users, or to determine whether it is worth querying to return the price e.g. is it likely to be good value.

The model may be used in other fields where there is a disadvantage to obtaining a price (e.g. cost of querying), but where the price was generated by structured means (e.g. pricing rules). This includes travel products such as hotels, trains, and car hire cars; as well as other products with structured pricing, such as insurance.

Other Applications

Consumer price comparison websites. Companies trying to price competitively by comparing prices with those of rivals.

Model Based Pricing—Inferring Missing Quotes

Inferring of missing quotes may take place in two stages, training and estimation:
training
building statistical model from historical prices
estimation
identifying missing quote candidates
pricing quote candidates based on statistical model In an example, a statistical model is a set of Naïve Bayes classifiers trained periodically (e.g. daily) with historical prices. Missing quotes are inferred based on route operators' data and priced using classifiers.

Example of a Statistical Model

Naïve Bayes classification is based on dependency between the probability that an object described by a given set of features belongs to a given class and the probability that an object from this class is characterized by a given set of features: see Eqs. (1) and (2) in FIG. 3.

Eqs. (1) and (2) can be simplified to Eq. (3) in FIG. 3. In Eqs. (1)-(3):
C is a class to which an input object can be classified (eg. in our case: price range e.g. 75-125 EUR)
$F_i$ is a feature value (eg. in our case: Friday, Air France airline website etc.)
Classification can be expressed using Eq. (4) in FIG. 3.

For a given set of feature values we want to find a class (price range), where they occur most often and thus maximise the probability that a class characterizes the input set.

Training

Figure 4:
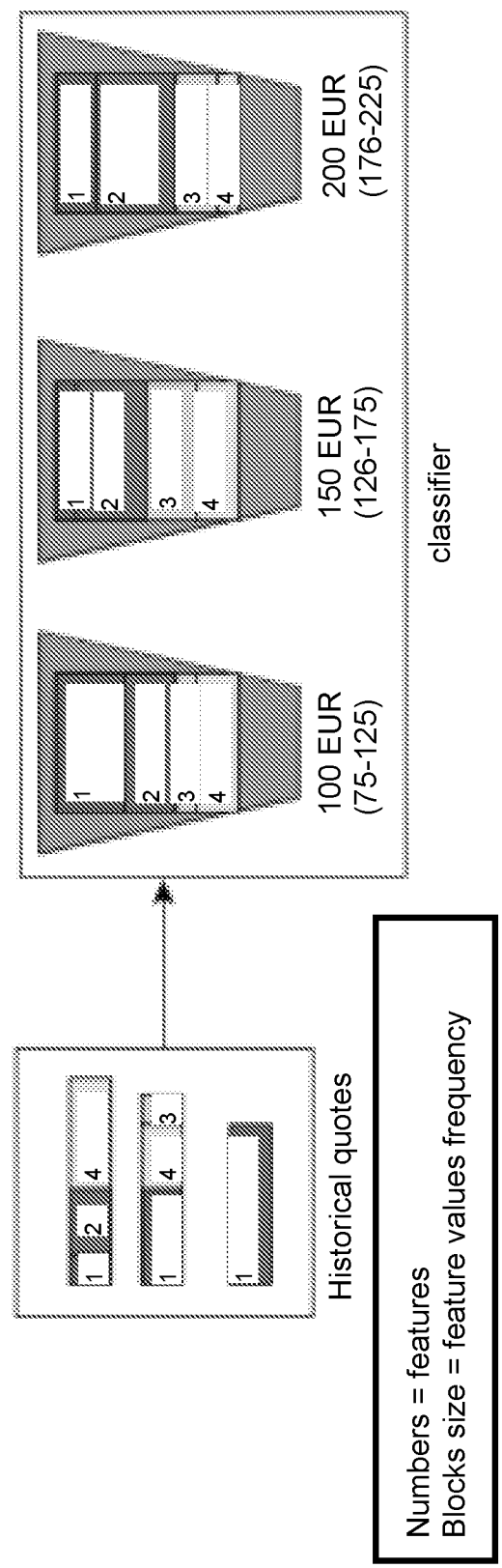
FIG. 4 shows an example in which feature values are represented by numbered areas and price ranges (buckets) represent frequency information.

An intention of classifier training is to calculate how frequently feature values occur for observed price ranges. In a process shown for example in FIG. 4 feature values are represented by numbered areas and price ranges (buckets) represent frequency information (e.g. feature values quantity in range 75-125 EUR, 126-175 EUR etc.).

The following elements are inputted for an example training process:
list of routes
classifier categorization scheme
historical quotes
set of supported features with weights A list of routes sets boundaries for training. A category defines a scope of a given classifier and is expressed by a set of feature values. An experimentally chosen category consists of a city-level route and airline (example: London-Paris, Air France), but other options are possible (e.g. city-level route without airline). There is always one classifier per category. A classifier is trained only with historical quotes matching its category (e.g. only quotes for London-Paris route operated by Air France).

In a first step of a training process, a given number of the most recent historical quotes with a certain maximum age is retrieved from a database. Categories are evaluated for every quote. Quotes are grouped by categories. Each group becomes a training set for one classifier.

A training set can be extended using quotes for reversed route equivalents. Example: for a historical quote on the route London Stansted-Rome Ciampino with Air France, a reversed route equivalent would be for Rome Ciampino-London Stansted with the same airline and other details like price. Quotes for reversed routes are included in training scaled by a weight adjusting its significance.

Next, for each group a classifier with the following statistical information extracted from quotes is built:
a weighted number of quotes containing each distinct feature value
a weighted number of quotes containing each distinct feature value per price range of given granularity
a number of observed price ranges, quotes per price range and all quotes Weights applied to a number of quotes can differ between features to emphasize a larger influence of some of them (e.g. a trip including a weekday may be more important than stay length).

The process ends with one classifier for each training set (e.g. one classifier for a London-Paris route operated by Air France) containing statistical information. A model is stored for future use. A classifier can be trained again e.g. periodically or when a number of historical quotes change.

A classifier may only be created if a certain number of quotes matching its category are available.

Figure 5:
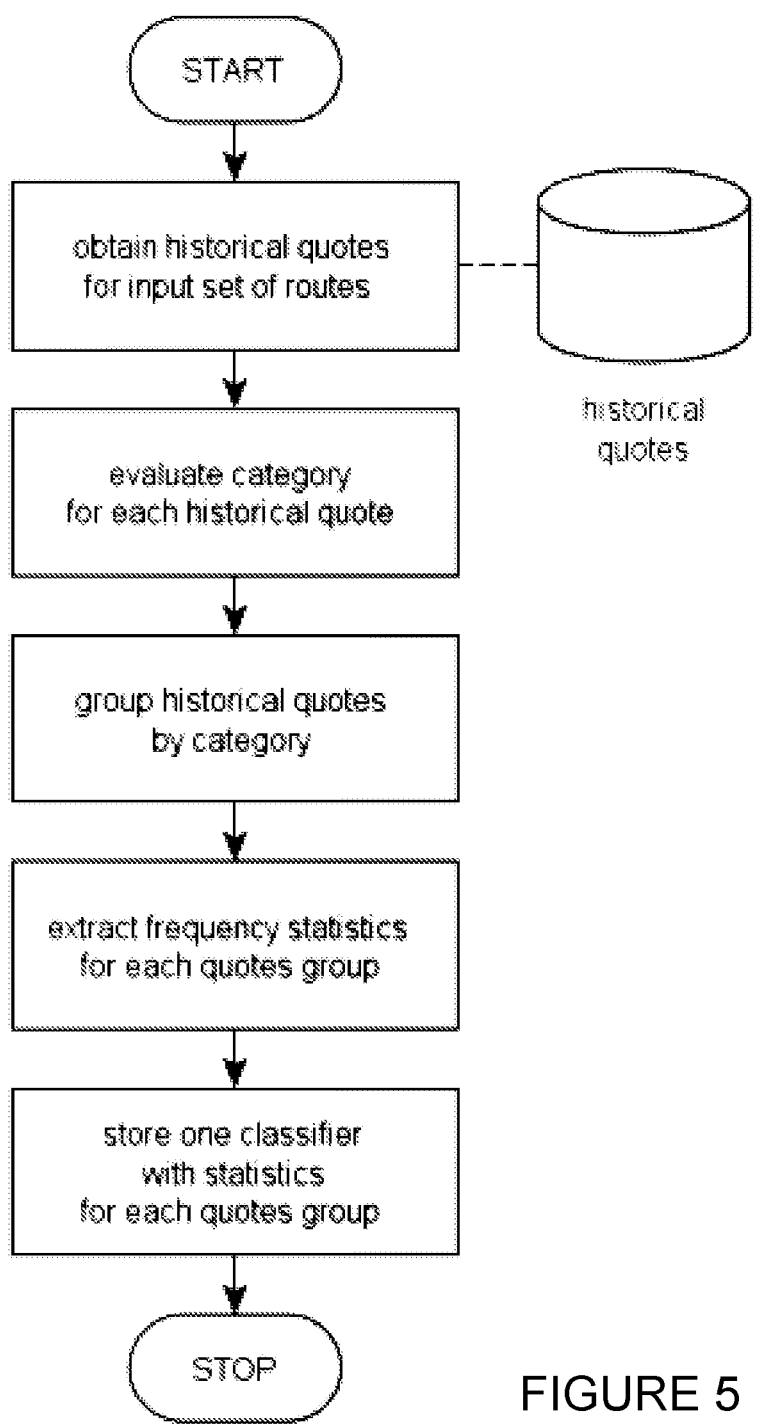
FIG. 5 shows an example of a full training process.

An example of a full training process is shown in FIG. 5.

Apart from parameters listed above, a training process can be parameterized by:
a size of price ranges per route (e.g. 1 EUR, 5 EUR, 10 EUR)
a weighting applied to reversed routes
a weighting function applied based on quote age Estimating Missing Quotes In an example, a user searches for one-way or return flights for a given route and dates range. A system responds to a query with a set of cheapest quotes from a database: up to one per each date (or dates pair—for return flights). The response may not include quotes for certain dates (date pairs). Missing quotes can be inferred using trained Naïve Bayes classifiers.

The following elements may be input for an inferring process:
a route
a list of dates (or date pairs) with missing cheapest quotes information Classifiers can only be used to price existing quotes, so candidate quotes must be evaluated first. Candidates are combinations of every applicable airport pairs, date (dates pair), airline and agent available for queried route. A list is generated based on the process inputs and a route operators' database.

Figure 6:
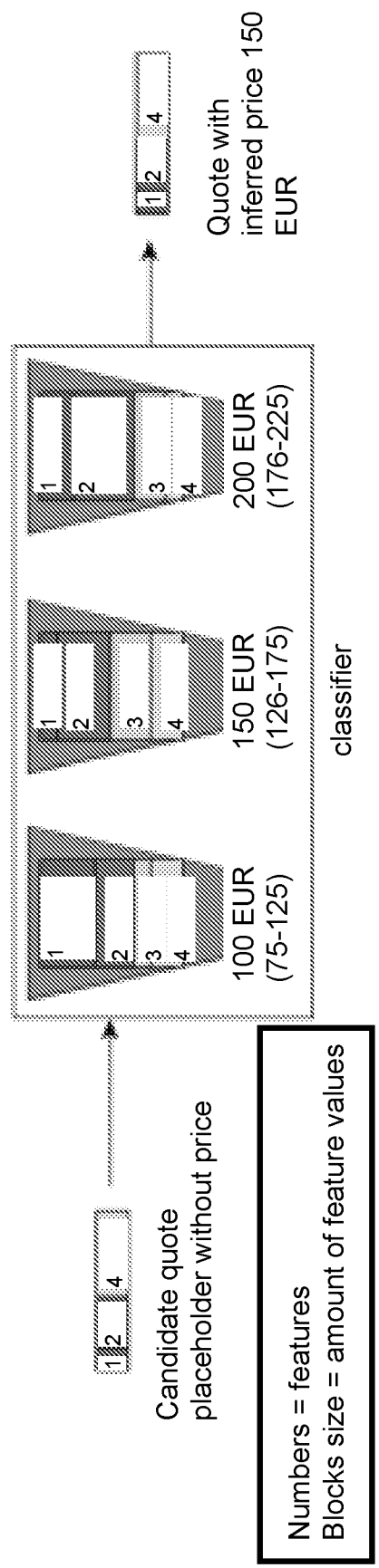
FIG. 6 shows an example in which Naïve Bayes classifiers can be used to price each candidate quote placeholder.

Next, Naïve Bayes classifiers can be used to price each candidate quote placeholder. See FIG. 6 for example.

Inferring prices may occur for each candidate quote in the following steps:
extract category feature values from the quote
retrieve from a database a classifier trained for an extracted category
extract all feature values from the quote candidate
classify the candidate quote by:
calculating Bayes posterior probabilities for each price range stored in classifier
choosing price range class with highest Bayes posterior probability
attach price class to candidate quote If no classifier exists for given candidate quote, a price is not inferred and a date (date pairs) slot remains empty.

A process can result in multiple priced quote candidates per date (dates pair). For this reason a next step is to choose a single quote for each date (dates pair). A choice can be made based on price e.g. cheapest quote per date (dates pair) is selected.

Figure 7:
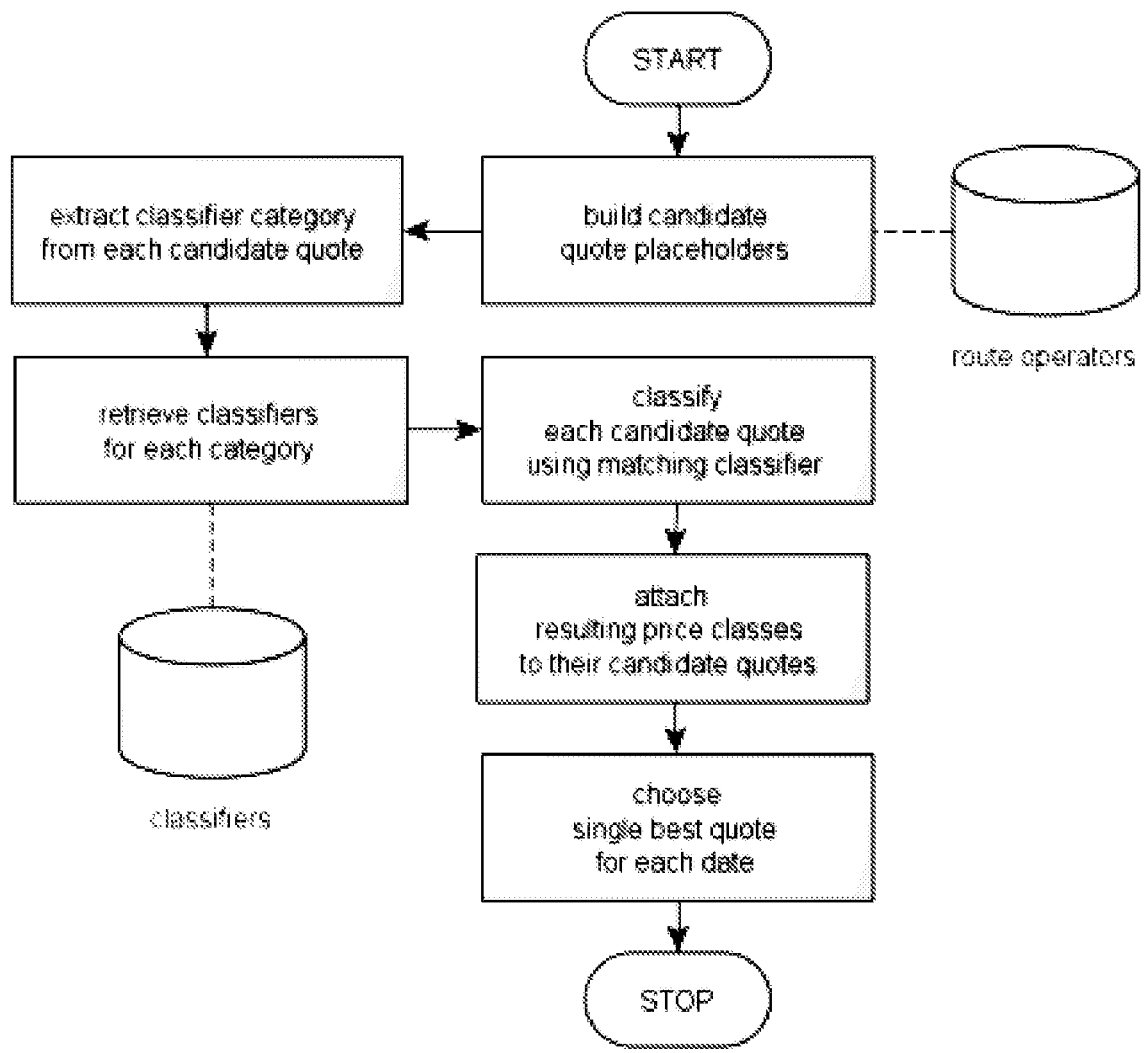
FIG. 7 shows an example of a full process of inferring missing quotes.

A final result of the process is up to one quote per input date (dates pair). Inferred quotes can be included in a response returned to a user. An example of a full process of inferring missing quotes is shown in FIG. 7.

Apart from parameters listed earlier, an inferring process can be parameterized by:
- a minimum Bayes posterior probability required to accept a classification result
- a maximum number of route operators involved in candidates' generation
- a random variation added to Bayes posterior probability to avoid ties Estimation Methods which Give a Confidence to the Price Estimation methods may be provided which give a confidence to the price. e.g. we are 99% confident it is within $5, $1000, etc. Hence the estimation methods may provide for:
- the calculation and return of those confidences.
- the use of those confidences to decide whether to display a price to a user, or to show a probable range of prices to a user (eg. error bars).

A number of methods of estimating a price are capable of returning a measure of confidence for the price. For example, in the case of the Naïve Bayesian classifier, the selected class is the class with the highest probability, but that probability can be used as an indicator of the confidence in the estimate—the closer the probability is to 1 the more confident it is that the predicted price is the correct one.

Figure 22:
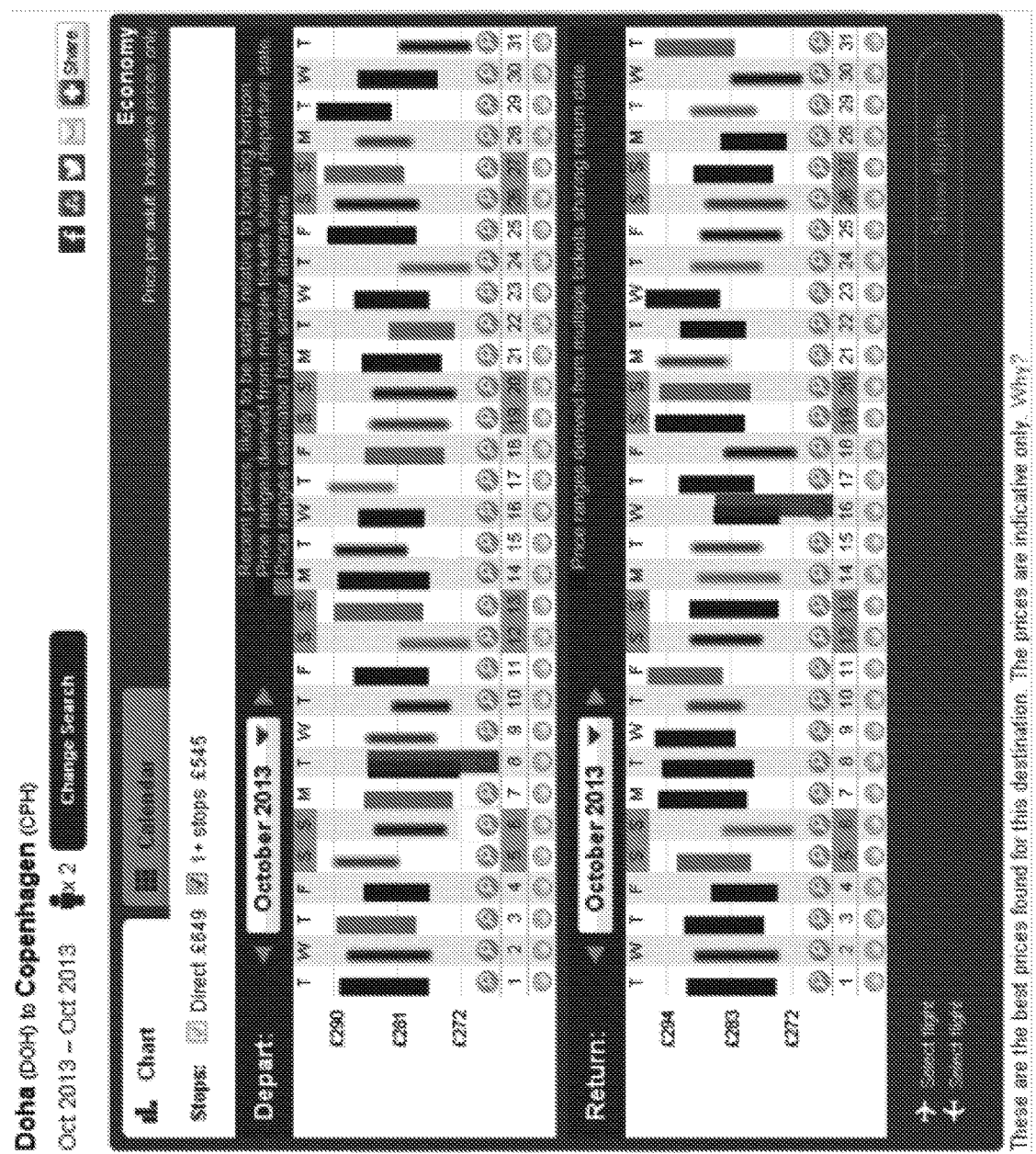
FIG. 22 shows an example a graphical indication of a confidence range for estimated prices using a bar, which spans a price range from the lowest price to the highest price of a range in which the price is to be found. The bar is provided for a range of outward journey dates and for a range of return journey dates.

The resulting confidence may be used in a number of ways. If there is a very low confidence in the estimate, the decision may be made:
- Not to show the estimate as it is not helpful for the user
- To trigger live retrieval of the price so that an exact value can be shown to the user The confidence can be shown to the user. This could be indicated in a number of ways:
- A bar showing the range of likely values for the price (see FIG. 22 for example)
- Reducing the visibility/intensity of the displayed price (for example with the use of colouring, shading or a dotted line).

A confidence range for estimated prices spans a price range from the lowest price to the highest price of a range in which the results of an estimation method lead to confidence that the price is to be found. A confidence range for estimated prices may be indicated graphically using a bar. The bar may be displayed for each date in a range of dates. The bar may be displayed for each date in a range of dates for an outward journey and for a return journey. The bar may be colour-coded eg. to indicate that the bar corresponds to recent prices which are likely to be stable relative to the booking function, to price ranges derived from multiple tickets sharing a departure date, and to price ranges estimated from similar itineraries. One bar may be provided for a given date. More than one bar may be provided for a given date. An example is given in FIG. 22.

B. Derived Availability Engine

Background/Motivation

The motivation is very similar to that in the Model Based Pricing example.

The 'scheduled' price model means that two single quotes cannot be used to create a return quote, and therefore a query has to be run for every possible date pair, and the large number of date pairs makes it prohibitive to do this due to the cost of obtaining the data and the space required to store it. The return prices, however, are the result of combining available fares available for the outward and inward legs, along with some rules. Thus if it is possible to know the availability and rules, it is possible to decompose a return query into 'reusable' legs that can be used to construct new 'return' prices, in a similar (but different) manner to that used for airlines with a budget price model.

Example of Derived Availability Engine

Global Distribution Systems gather schedules from OAG (Official Airline Guide: see e.g. www.oag.com), fares from ATPCO, and fare class availability from the airlines, and store this information in their own systems. This stored information is periodically updated from those sources. When a query comes to a GDS to quote for a given route and date(s), the GDS performs the following steps:
1. Determine valid itineraries from schedules
2. Compute valid fares for the itineraries (Some GDS do not have pricing engines and use a third party engine, such as one provided by SITA (see e.g. http://www.sita.aero/), to ensure the correct price is applied for each itinerary travelled.)
3. Find the availability of those fares
4. Adding the correct taxes and surcharges Step 1 may be achieved in routes services. Specifically, it may be achieved by using timetables and rules about what can be sold; given a user query we can identify the valid itineraries that a ticket can be bought for.

Airlines submit fares to ATPCO, and ATPCO provide subscriptions to these data, but transforming these raw fares and rules into a system for determining the correct fare for a given query would be a massive effort. Fortunately, ATPCO supply merged fare and rule data in a data feed called FROP (Fare Rule Output Product). FROP data are transmitted in a fixed-length file of records containing fare information and summarized rule conditions for key categories. Therefore Step 2 can be accomplished using the FROP data. It can also be achieved by combining fare rules and prices from airlines, using a pricing engine.

ATPCO also provide a feed of itinerary and service fee taxes. A tax and surcharge engine can be built that takes the data in these subscriptions and uses them to calculate the overall price a customer would pay for a given fare, thereby emulating Step 4.

Figure 2:
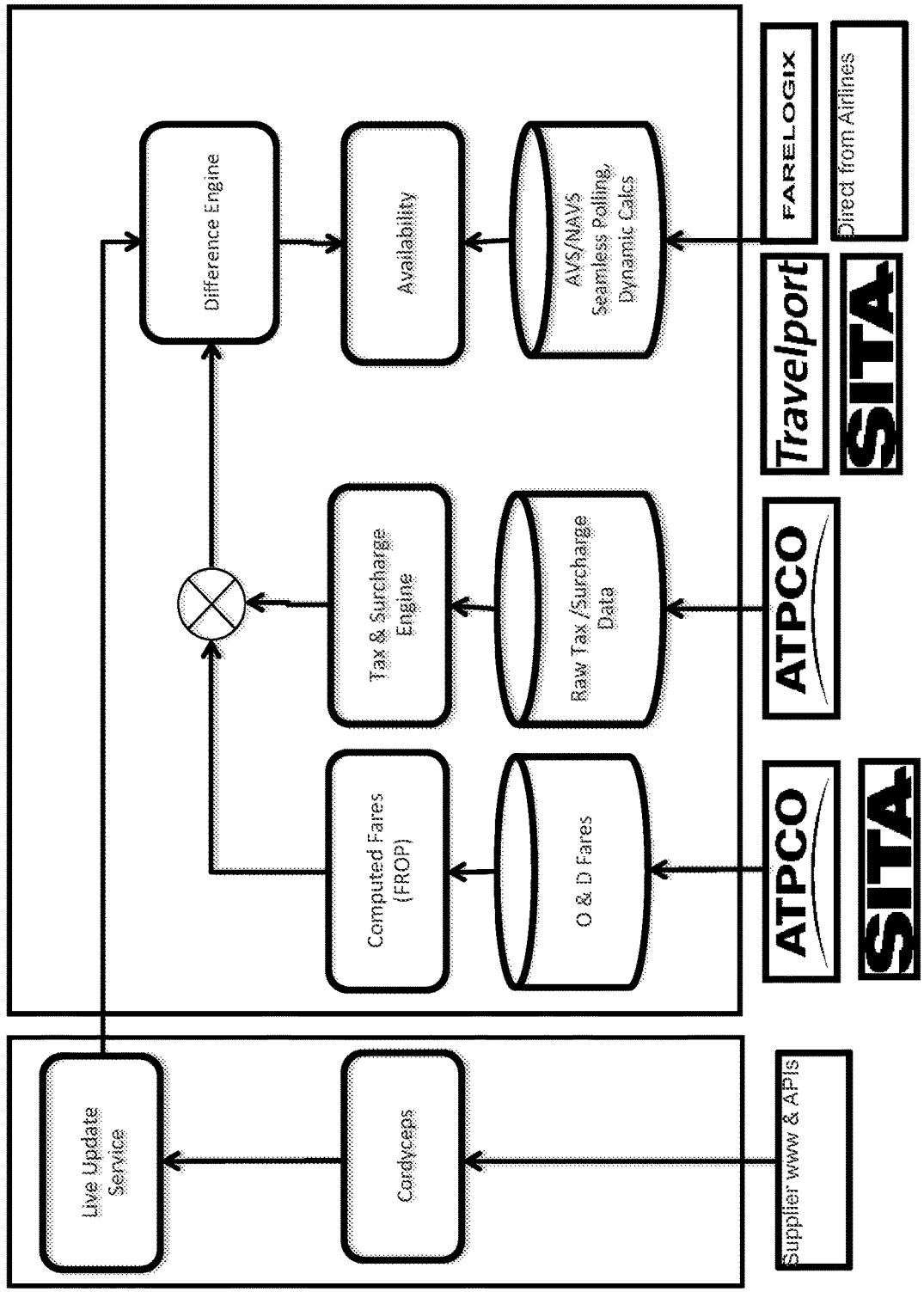
FIG. 2 shows an example of how a 'difference' engine can be used to derive the availability of fare classes from a live update.

The only remaining item for low cost calculation of GDS fares is the availability—Step 3. It is possible to derive availability by comparing the result of a live update (the net result of Steps 1-4) with the calculation of Steps 1, 2, and 4 outlined above. i.e. by combining the routes service, fares from FROP and a tax and surcharge engine it is possible to compute all the possible fares, and the observed fares from a live update can be used to infer which of possible fares was used, and therefore which of the computed fares were available. The diagram in FIG. 2 shows how such a 'difference' engine can be used to derive the availability of fare classes from a live update.

If the available fares are known for both the outward and inward leg of a return flight, the return price can be calculated even if the specific pair of dates in the return has not been observed. This way of modelling quotes is known as Single Leg Combinable (SLC). SLC is similar to the 'budget' price model except that in the budget case the outward and inward legs of a return are also valid as single tickets. In the budget case constructing returns is simply a matter of adding the inward and outward leg prices (SLC construction is slightly more complex as it requires finding the valid fares for the date-pair and then applying availability).

If the price of a fare increases, while availability remains the same, the derived availability engine can be used to calculate the new price without it having even been observed.

There are additional benefits to producing this feed of derived availability compared to using a GDS. Pure calculation in a GDS does not guarantee that the fares are 'findable' on airline or OTA websites, whereas observed fares are—by definition—findable. Also, pure calculation also does not account for extra fees, mark-ups, discounts, and private fares which can be embedded in the observed fares.

Note that fare prices don't necessarily change, but there are lots of different fares for a specific flight, and the availability of each fare can change: yield management software may continuously alter what fares are available, so cheaper tickets may just disappear as yield management withdraws them to increase yield.

Further Example of Derived Availability Engine

A derived availability engine may use fares from a centralized registry, such as ATPCO FROP, and taxes and surcharges data, to evaluate availability information (service class) for a given set of observed quotes.

Figure 23:
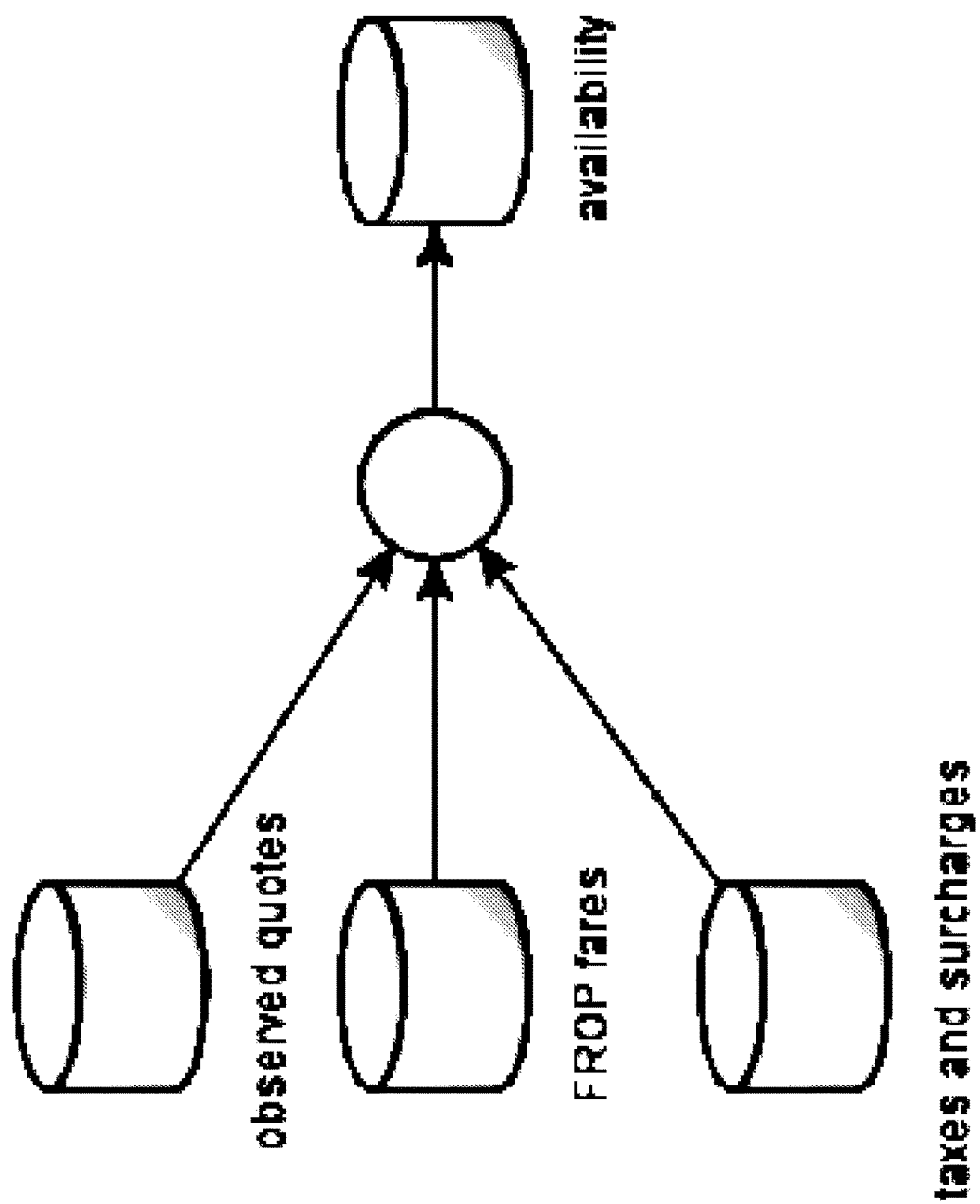
FIG. 23 shows an example of main components in a system for deriving fare class availability and of the flow of information in the system.

An example of main components in the system and of the flow of information is shown in FIG. 23.

Observed quotes can be obtained from OTAs, airline websites, APIs and other services. Each quote can contain airport-level route, airline, flight number, price (fare and/or taxed price) and other details.

An example of an authority source of fares is an ATPCO product called FROP. FROP is available for a subscription fee and contains fares in a flat, tabular format. Each FROP record contains information like city-level route, airline, service class, price and constraints describing when fares can be applied (e.g. advance purchase specification). FROP is built from data published by airlines.

Taxes and surcharges data can be obtained from public sources (e.g. airport or government websites). Data are also offered by ATPCO as a paid product, which covers government taxes, airport fees, fuel charges and majority of other components added on top of fares. A final price paid by the passenger is a sum of fare price and taxes and surcharges amounts.

With listed components we can attempt to derive availability (service class) of each observed quote by applying a process as described below.

A first step of the process is to evaluate a set of observed quotes we are interested in (e.g. by given search criteria like route, travel dates, passenger information etc.). Next we need to find FROP records matching a search query for which quotes were observed.

With both sets of prices we must reduce them to a comparable format. Next step depends on whether observations include non-taxed or taxed prices only. In the first case we can directly compare observed fares with FROP. Otherwise we need to calculate and add taxes and surcharges to all FROP fares taking into account query conditions (e.g. number of type of passengers, point of sale etc.).

With observed quotes and FROP in the same form (taxed or non-taxed) we can compare the quotes to find matching ones. We assume quotes and FROP are equivalent if they have the same price.

Depending on the form of the fares from the authority (in this case—FROP) the matching process may require additional steps like constructing return fares from multiple one-way records to match observed return quotes.

At this point a link between FROP records and observed quotes has been established. Now for each observed quote we can derive fare class availability by applying a service class from equivalent FROP records.

Figure 24:
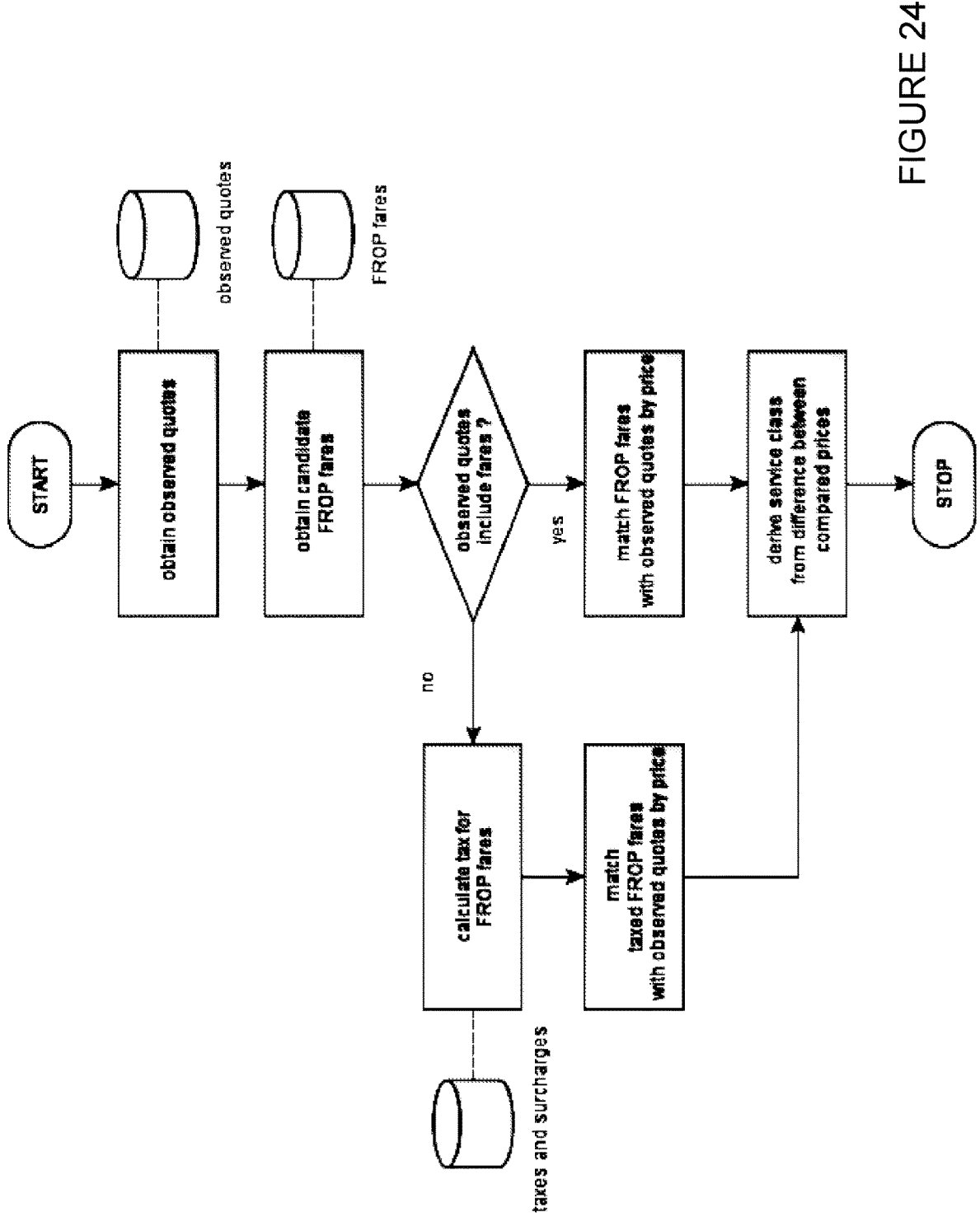
FIG. 24 shows an example of a process for deriving fare class availability.

An example of a process for deriving fare class availability is shown in FIG. 24.

Benefits

Deriving availability rather than requiring queries to a GDS or airline reservation system in order to find it Calculation of new prices on the basis of estimated availability, rather than true availability.

Estimation of new prices based on availability and fare rules, without having observed instances of the new prices.

Potential Other Applications

Providing airlines with pricing of their own products, as they are also currently pricing this from the GDS at a high cost.

Companies interested in finding flight data prices, at a considerably reduced cost.

Architecture Overview Example

There is provided a server (which may be real or virtual) from which estimation services for fare availability and price are provided. A related website, smartphone apps, business-to-business services, connections with traditional airlines (eg. British Airways, Qantas, KLM etc.), connections with budget airlines (eg. RyanAir, easyJet, germanwings etc.) and travel booking websites (eg. lastminute.com, opodo, Thomson etc.) may be provided.

Figure 8:
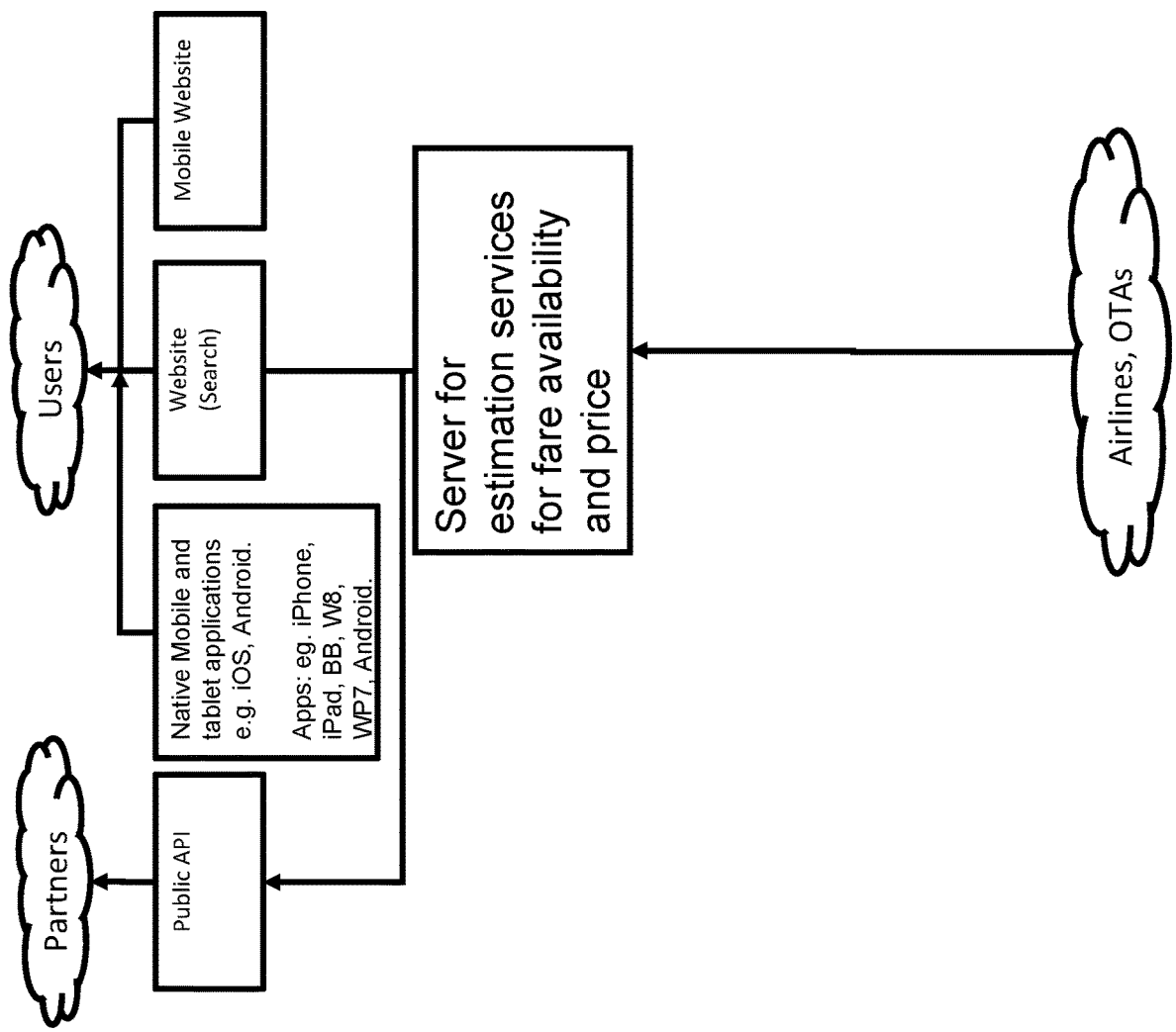
FIG. 8 shows an example of connections between a server providing estimation services for fare availability and price, and input data sources, and output to partners and to users.

Travel booking websites and airlines may provide input data for the server from which estimation services for fare availability and price are provided. Output may be provided by the server to a public application programming interface (API) e.g. to partner companies. Output may be provided by the server to a website for searching, to a mobile website for searching, and to apps on smartphones, for users. An example connection configuration between the server and input data sources, and output to partners and to users, is shown in FIG. 8.

Figure 9:
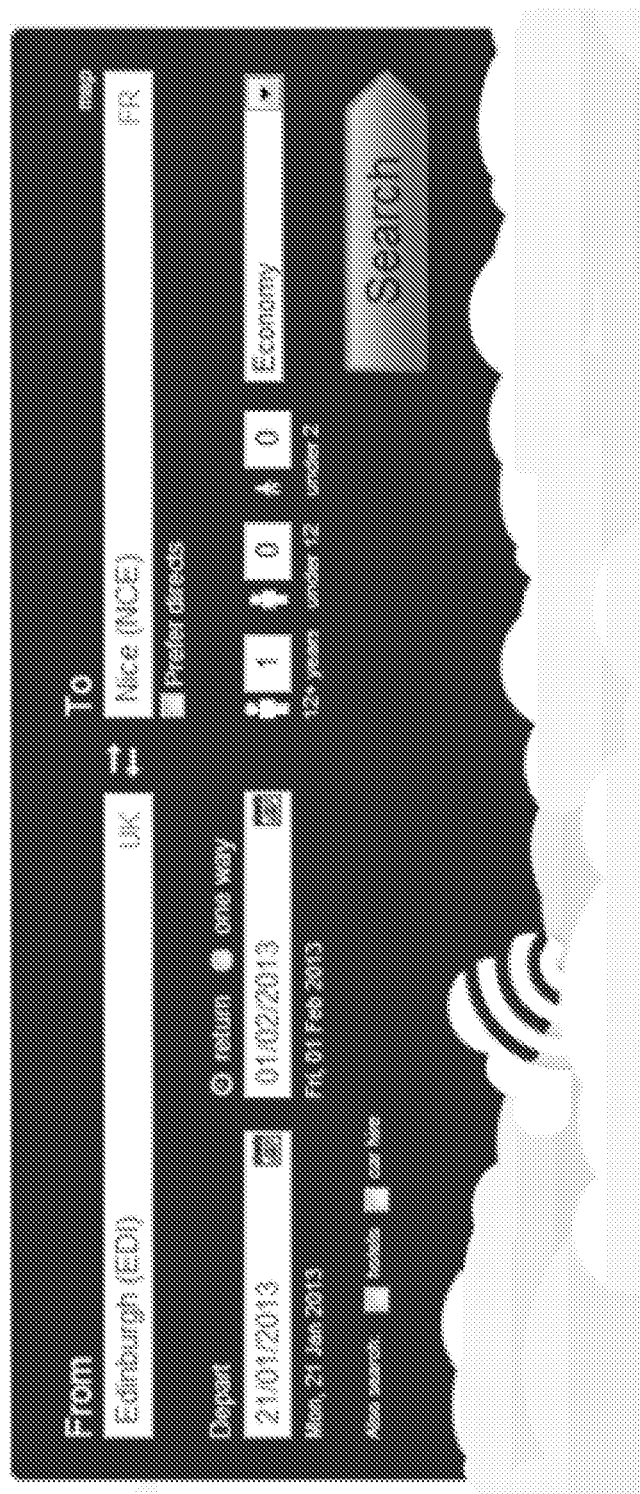
FIG. 9 shows an example of a user interface.
Figure 12:
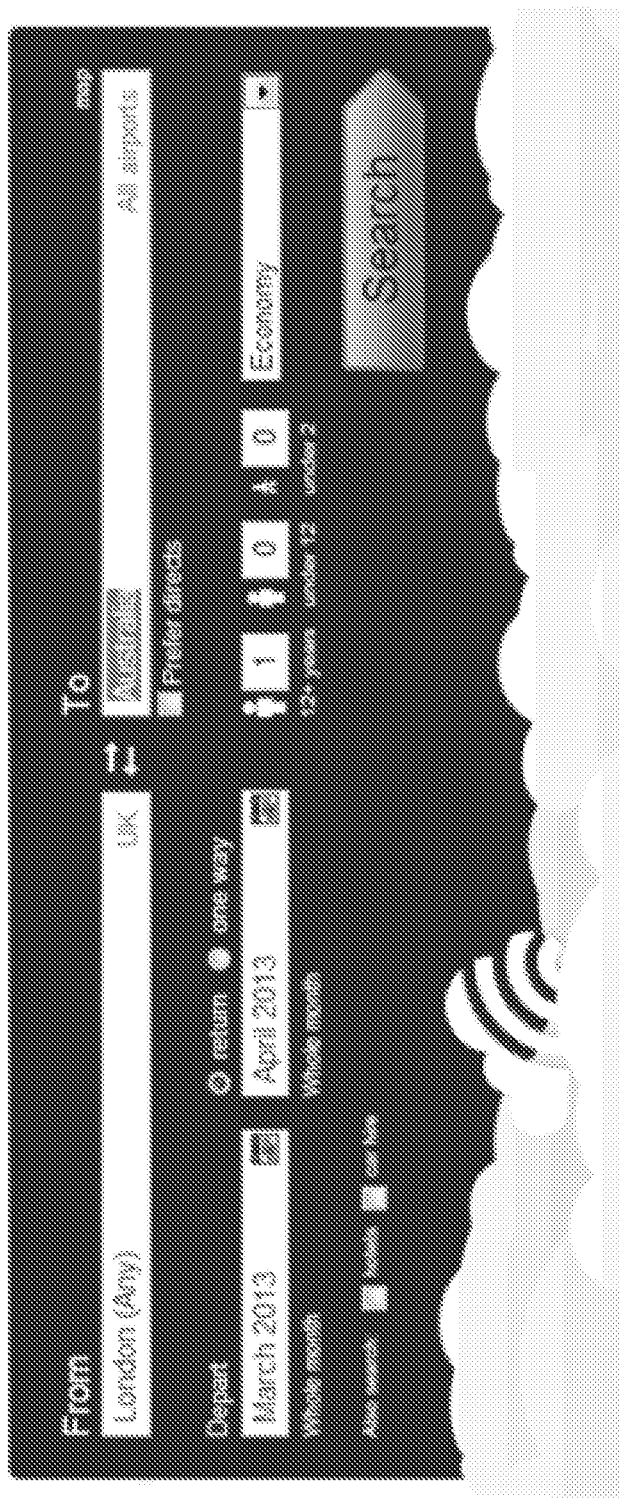
FIG. 12 shows an example of a user interface.

In a search at the server, a user may specify a start location (which could be an individual airport, a city including a plurality of airports, or a country including a plurality of airports, for example). In a search at the server, a user may specify a destination location (which could be an individual airport, a city including a plurality of airports, or a country including a plurality of airports, for example). In a search at the server, a user may specify a departure date or a range of departure dates (which could be a date range, or a calendar month, or an unspecified date which could imply a date range such as any date in the coming year, for example). In a search at the server, a user may specify a return date or a range of return dates (which could be a date range, or a calendar month, or an unspecified date which could imply a date range such as any date in the coming year, for example). In a search at the server, a user may specify a one way ticket or a return ticket. A user may specify the number of passengers in specific age ranges. A user may specify a class of ticket (eg. economy, premium economy, business class or first class, for example). A parallel search for hotels may be performed. A parallel search for car hire may be performed. A preference for direct flights may be indicated. An example user interface is shown in FIG. 9. A further example user interface is shown in FIG. 12, which is an example of a flexible search, because the departure indicates the airport used in London (UK) may be any, and the destination indicates that any airport in Australia is permitted.

Figure 10:
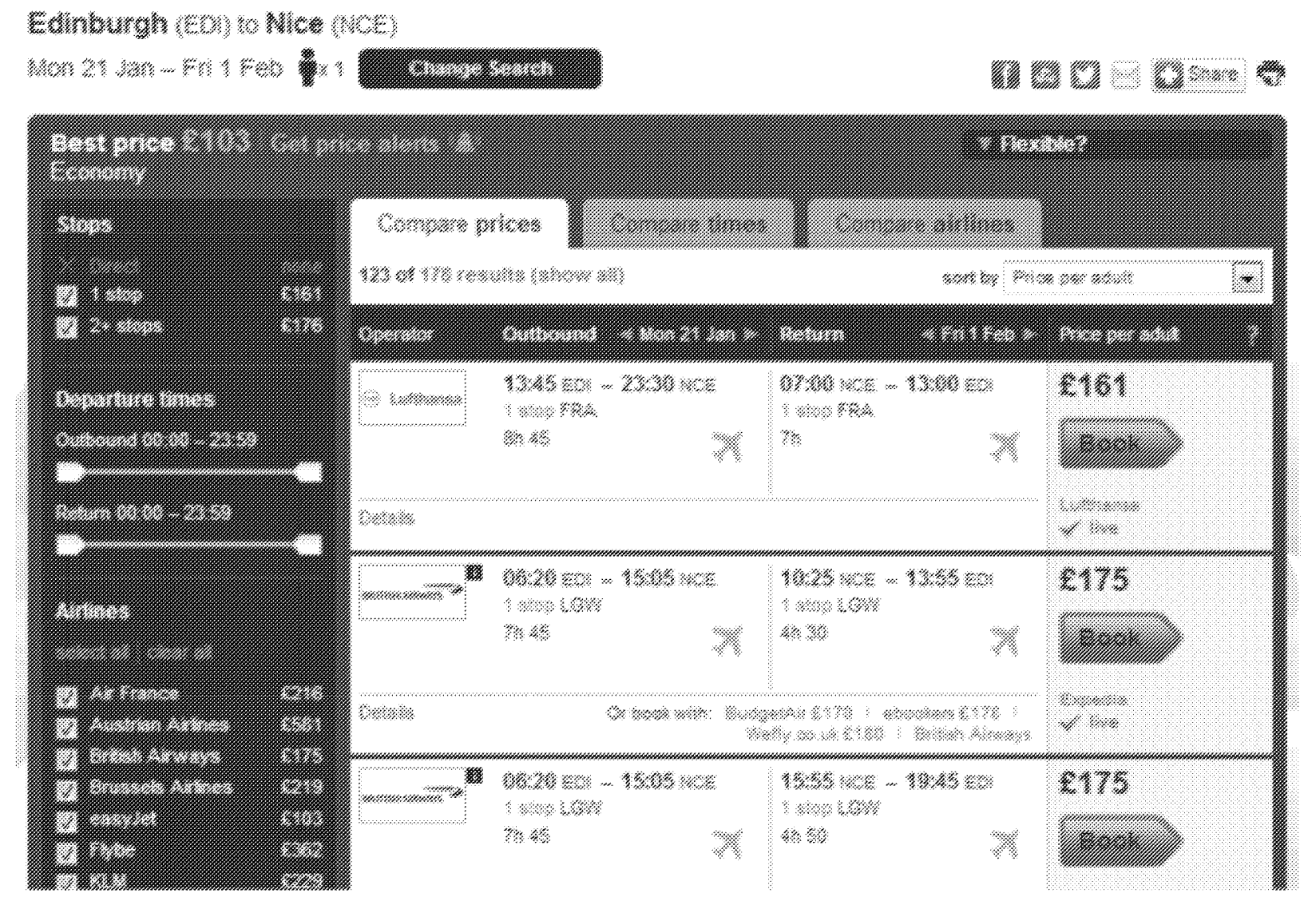

Output search results may include a list of flights which satisfy the search criteria. A graphical indicator (eg. a slider bar) may be provided to limit the outbound flight departure time range. A graphical indicator (eg. a slider bar) may be provided to limit the return flight departure time range. A selectable tab may be provided such that flights may be arranged in order of increasing cost. A selectable tab may be provided such that flights may be arranged in order of increasing travel time. A selectable tab may be provided such that flights may be arranged in order of airline name in alphabetical order. An example user interface is shown in FIG. 10.

Figure 11:
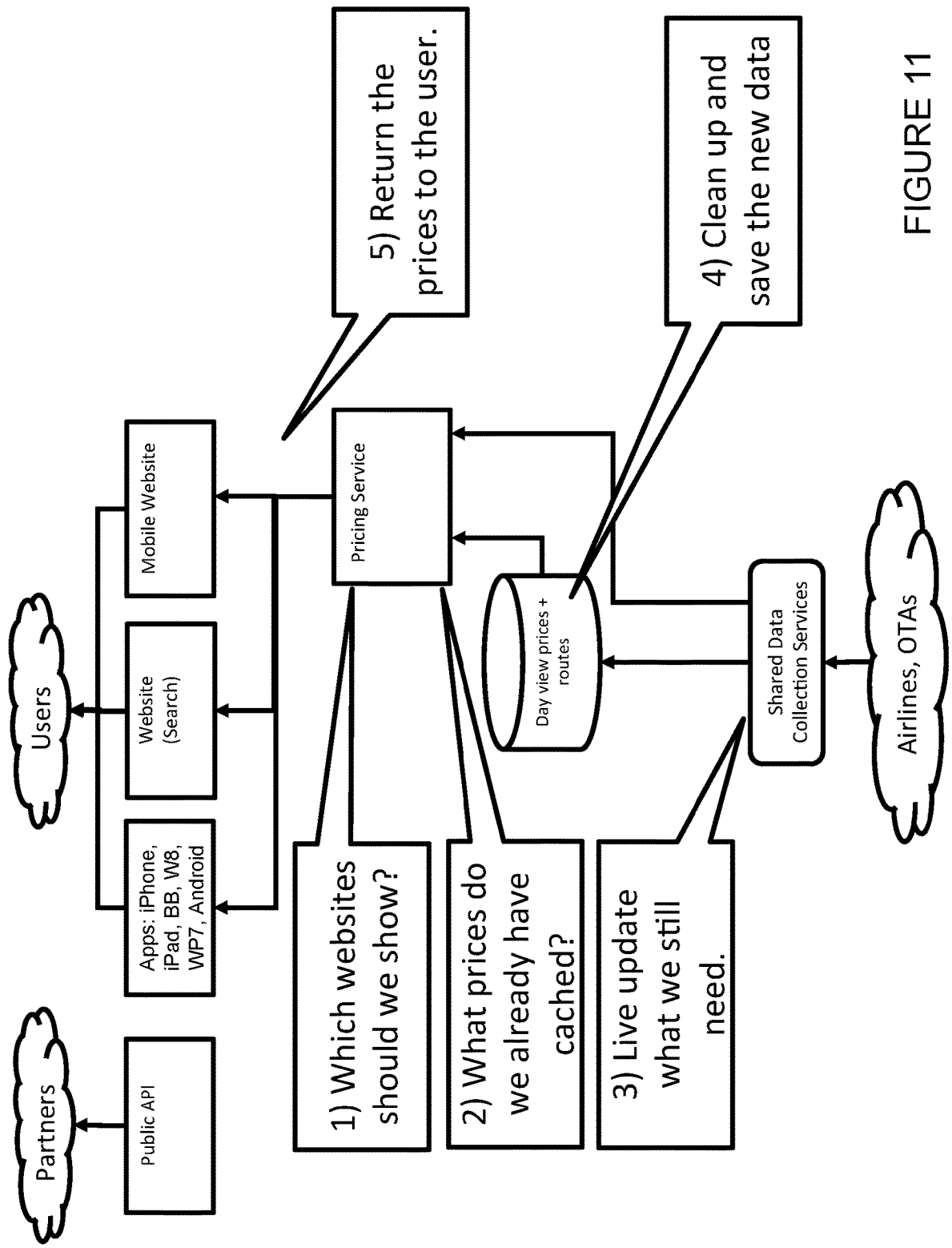
FIG. 11 shows an example of a system for performing a search process.

In an example search by a user, a flight between a start and a destination is requested (which may be a one way or a return flight), for an outbound flight date, and a return flight date if relevant. In an example search process, in a first step, partner search websites from which to show output are selected. In a second step, relevant prices that are already cached are identified. In a third step, relevant prices that are not available are identified and updated. In a fourth step, the new data is cleaned up and saved (for example, taxes and fees may be stripped out, and who the real flight operator is may be identified). In a fifth step, prices are returned to a user. An example of a system for performing a search process is shown in FIG. 11.

Figure 13:
FIG. 13 shows an example of user interface output.
Figure 14:
FIG. 14 shows an example of user interface output.

In a flexible search, output data may provide a list of destination airports which satisfy a flexible search criterion (eg. destination is any airport in Australia, starting from any airport in London, UK), which may be listed in ascending order of price. An example of user interface output is shown in FIG. 13. Upon selection of a particular airport, a minimum price for an outward leg of the journey may be presented as a function of outward departure date eg. for a selectable calendar month, and a minimum price for a return leg of the journey may be presented as a function of return departure date eg. for a selectable calendar month, for selected start and destination cities or airports. An example of user interface output is shown in FIG. 14.

Figure 15:
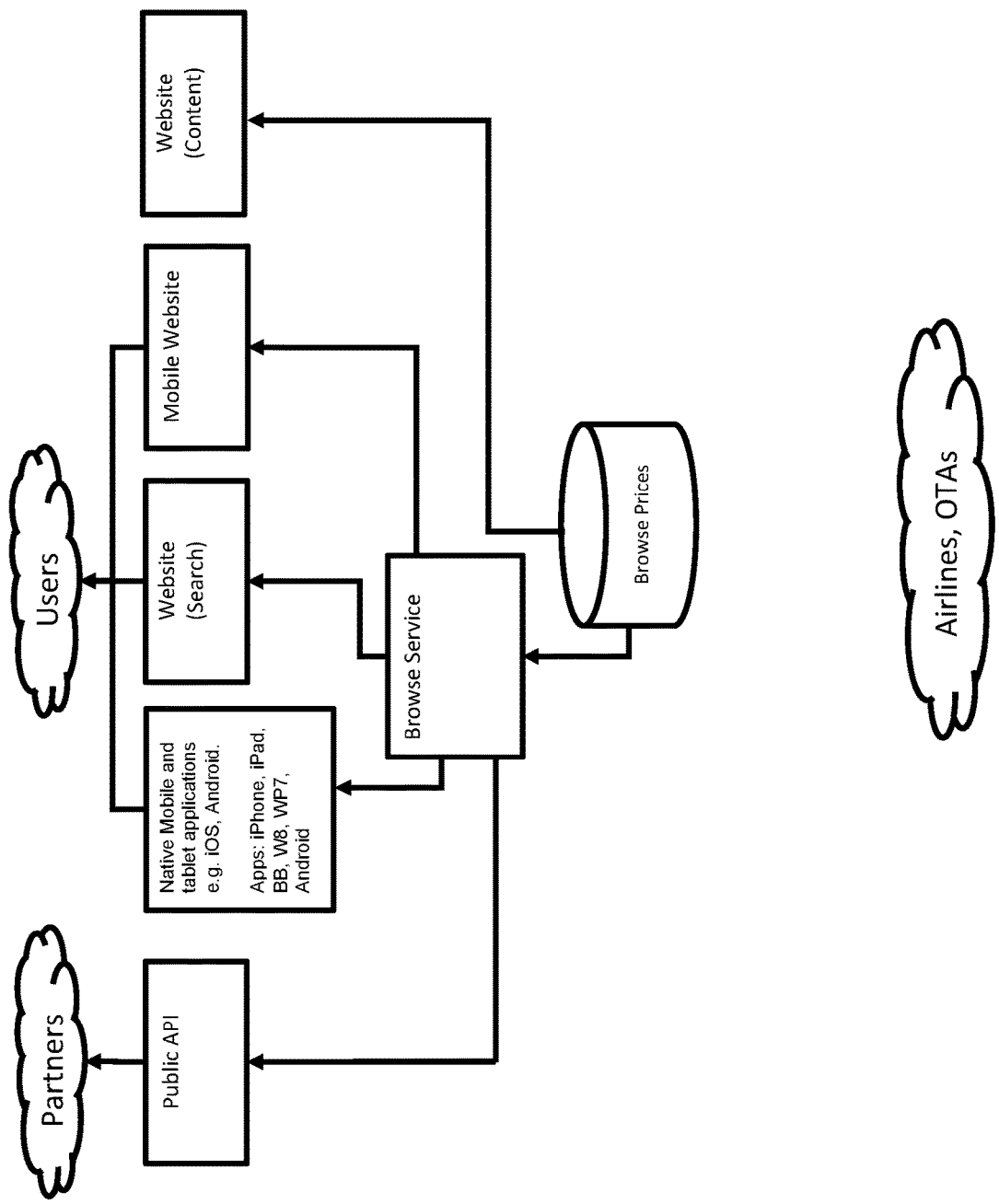
FIG. 15 shows an example of an architecture for browse searches.

Browse searches may be provided. A browse service may be provided to users of smartphone apps or to users of a search website. The browse service may access browsed prices data. Browsed price data may include data that has been scraped from website content. The browse service may be connected to a public application programming interface (API). The browse service might not be connected to airline servers or to the servers of other travel information service providers. An example of an architecture for browse searches is shown in FIG. 15.

Figure 16:
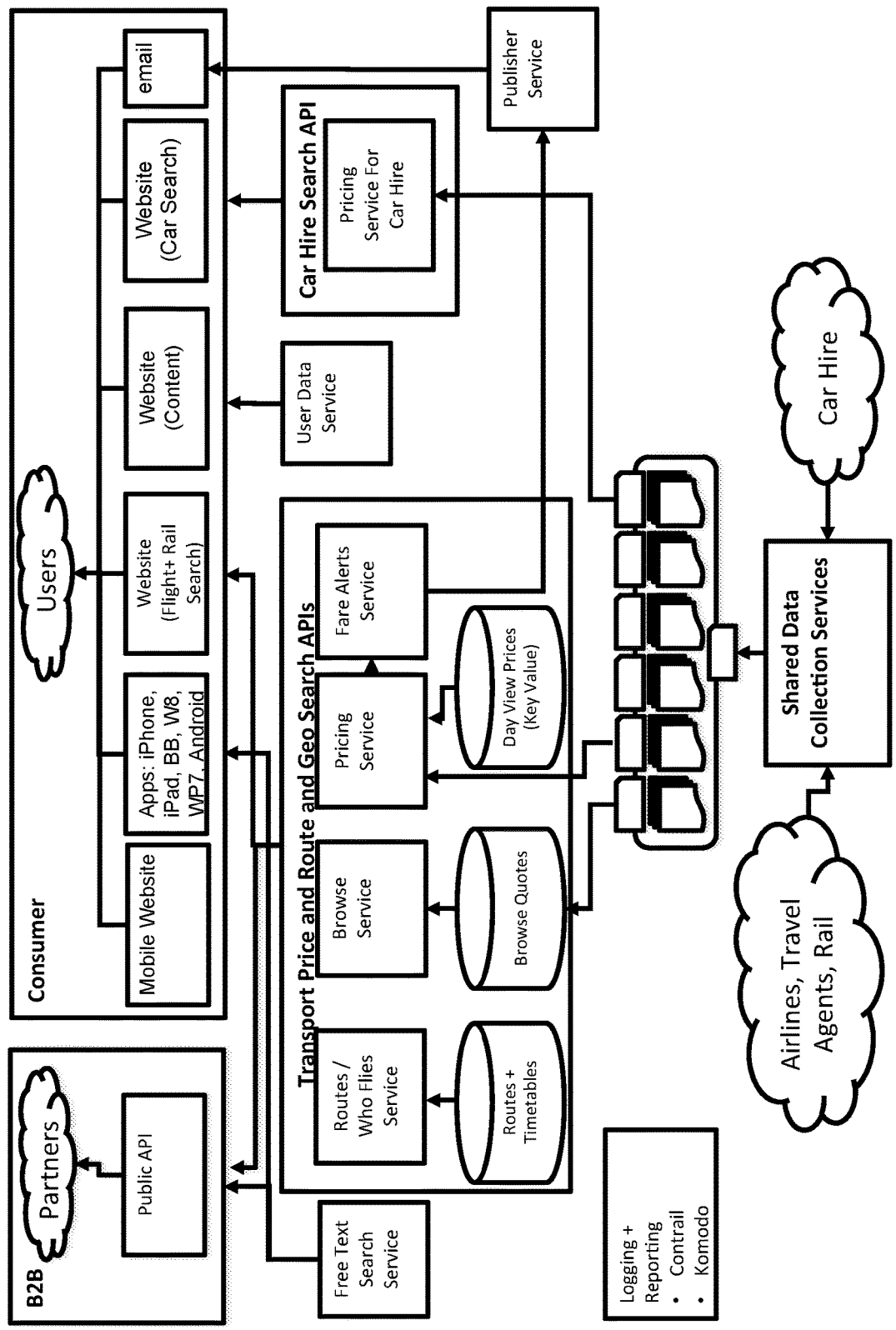
FIG. 16 shows an example of an overall system architecture for a system which includes provision of estimation services for fare availability and price.

An example of an overall system architecture for a system which includes provision of estimation services for fare availability and price is shown in FIG. 16.

The following section provides background information on how airfares are calculated and the role of the GDS.

C. Introduction to Global Distribution Systems

Figure 17:
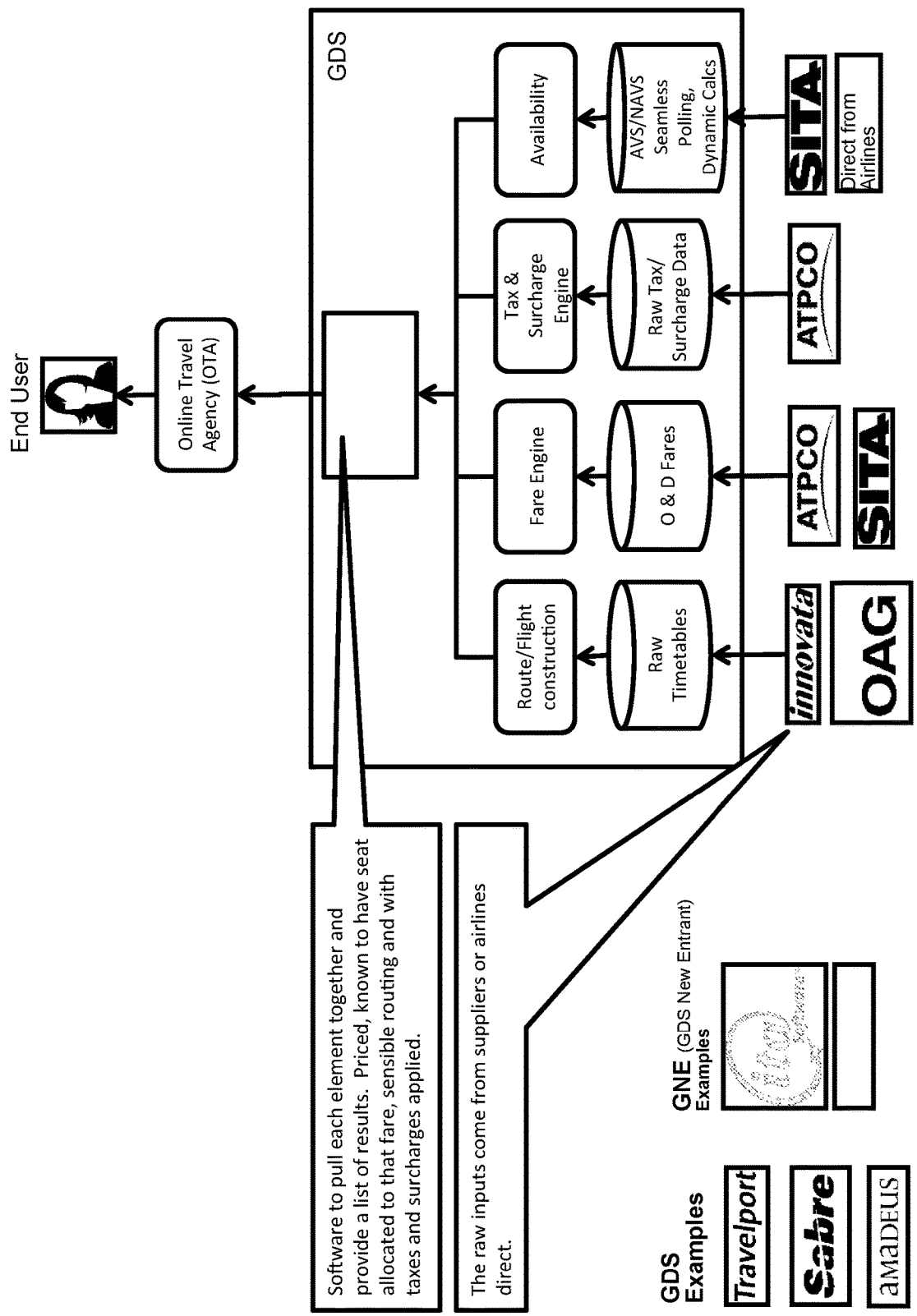
FIG. 17 shows an example GDS configuration.

A Global Distribution System (GDS) may be defined as a system containing availability, prices, and related services for Airlines and through which reservations can be made and tickets issued. The GDS makes these functions available to subscribing travel agents, booking engines, airlines and to other subscribers. An example GDS configuration is shown in FIG. 17. A more general term is a "Distribution System", which may include the ability to make reservations for modes of transport other than air transport, for example, e.g. trains.

Route Explorer

Historically, GDSs have added exploring routes as airline networks grew. As the number of potential and possible connections increased exponentially (SOF-NYC has a large number of connection points, e.g. SOF-IST-NYC, SOF-FRA-NYC, SOF-MOW-CPH-NYC, etc), GDSs added this layer of 'connection' building to reduce the number of different priceable routes, so that they do not have to process that many fares and rules. They did that in a very blunt manner—static route and connection tables, which will tell them that to fly between zones (defined by ATPCO-US-EUR, EUR-APAC for the simplicity of argument), in essence including in the route explorer cities between SOF-NYC, potentially a couple in the wrong direction (such as IST), but dismissing a great number of cities as a possible connection—e.g. a flight SOF-PRG-CPH-NYC might be considered too complex and potentially expensive, so it is dropped at the route explorer stage.

Connection Building

After the routings are established, the connection building starts looking into carriers, flight numbers, and connection restrictions, which are included in the Minimum Connect Time (MCT) tables. The MCT, distributed by OAG, is a complex document which specifies general rules how flights/carriers can connect in terms of time e.g. IF long-haul US-EU connect at LHR to a EU-EU, apply 120 min MCT. The general rules are easy to interpret, but are important—a manual override is needed if someone wants to place a booking outside the MCT parameters.

Where it gets interesting is the MCT exceptions—about 200,000 or so, which can go down to IF DL flight #003 connect to an AF flight #004, then require 55 min. However, if DL flight #003 arrives at CDG at Gate 19 and connect flight AF009 departs from Gate 49, then apply an MCT of 65 min, etc. About 70,000 of all exceptions are for Air France (AF) and Paris Charles De Gaulle airport (CDG)—that's why many passengers consider it the worst to fly through.

Fares

An example of a fare is a pricing contract, which specifies a price (base fare) for a service provided by the carrier, defined by service class, class type (Y, Q, J, M, H, etc) and type of trip (one-way, round-trip, multi-city, round-the-world (RTW)).

In an example, each fare comes with an attached number of rules and restrictions that apply to it—think of a fare as a contract that is 20-30 pages long, rather than just an excel raw (a spreadsheet or CSV file). So rather than thinking of a fare as a row in a big excel spreadsheet with columns indicating which features a fare has, instead one should think of a fare as a complex thing in its own right with many parameters and restrictions and therefore rather more like a contract. The fare defines who, when, and how one can use the fare—passenger type, when the fare is applicable (NVB, NVA—not valid before, not valid after) and a whole lot of other restrictions. A fare could be a public fare (accessible to every reseller) or a private fare (accessible to specified reseller/seller).

Fares are provided by carriers; they are defined at a general level to a market, and are limited by travel and ticketing dates. Naturally, a fare represents a price point.

Fare Upload and Distribution

ATPCO is an industry body that handles the fares and fares distribution in the industry. There's a small number of carriers which distribute only to SITA (Bulgaria Air is an example).

Scheduling

Previously, ATPCO would release the fares on a specific schedule, but per carrier request, the organization started releasing the fares hourly. This allows airlines to ensure quick reaction to market changes that are not suitable only for availability controls.

SITA releases its fares 4 times a day on the weekdays and 3 times over the weekend. There are also fares that live in the GDS (GDS-specific fares, or negos)—these fares are entirely under the control of the GDSs and do not follow a general distribution schedule.

Fare Rules and Restrictions and Categories

Fare data, fare class data, and fare restriction data are provided.

How does Pricing Work (Very High Level)?

Rules are calculated by a pricing engine in a very strict order of rule records, tables, and sub-tables. If no specific rule records are found, then there is a General Rule that governs them all.

Restriction Data:

Fare Class tells engines that there is a rule for a specific fare

Category Control tells engines what types of restrictions exist

Category Data tables are last, when the engines read to get the relevant information For example, fare class tells engines there is a rule attached, which is Category 15 (Sales restrictions), which, after digging into the Category Data Tables pulls additional information on it—what type, what are the rules and restrictions.

Figure 18:
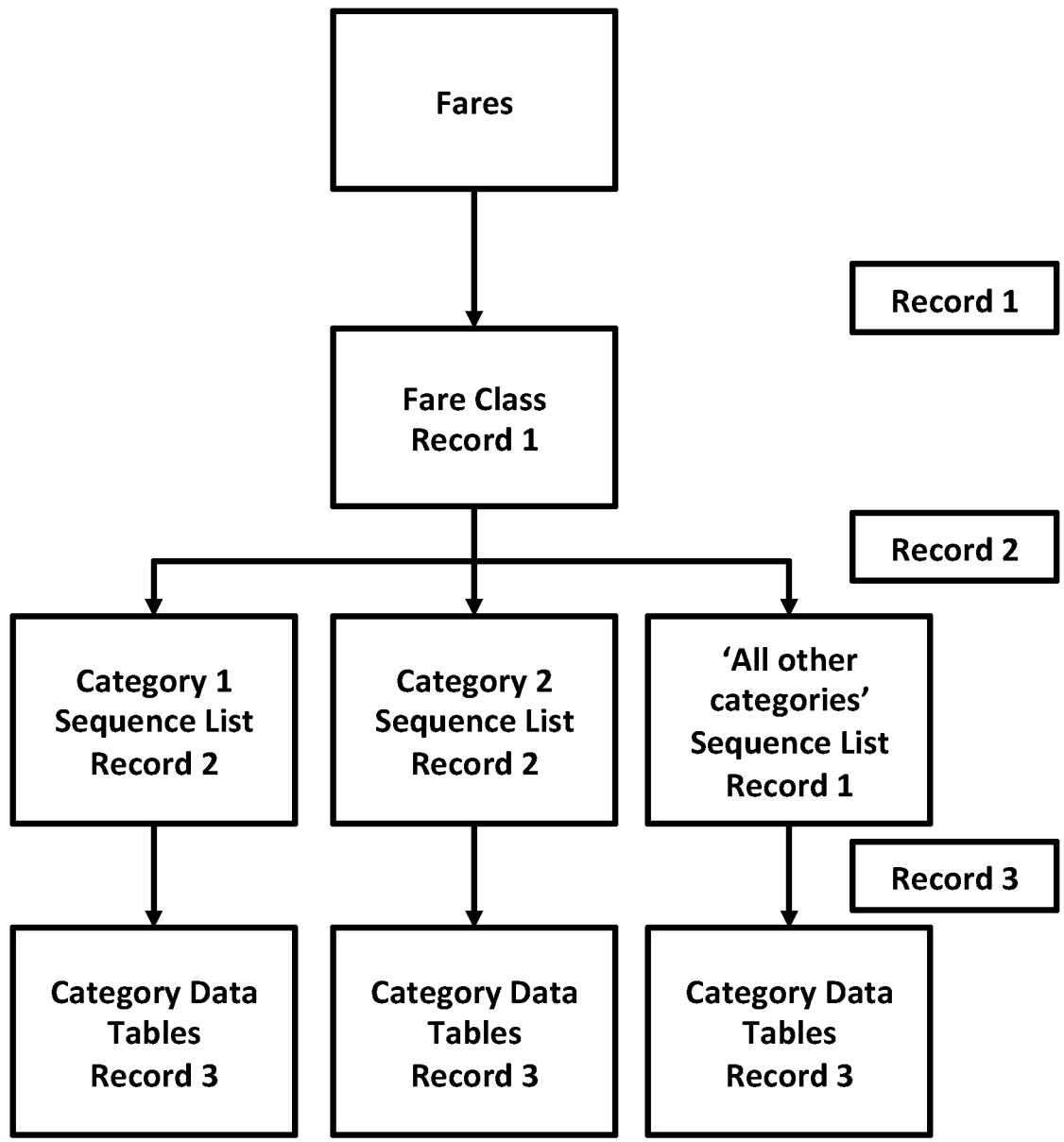
FIG. 18 shows an example of fares regarding a fare class record, fare categories, and category data tables.

An example of fares regarding a fare class record, fare categories, and category data tables, is shown in FIG. 18.

Fare Display Vs. Fare Quote and Process

A lot of industry professionals use the terms Fare Display and Fare Quote interchangeably, which for experts is not acceptable. Let us explain that:

Fare Display:

A comprehensive, consolidated picture of the market fares and related rules. This allows agents to:

Compare fare rules (N.B! not prices)

Communicate contract terms (fare rules) to passengers

Fare Quote:

A final price, after contract terms have been applied. It captures pretty much what we would like to give to the passenger:

All taxes

All surcharges

All regulations related to it

Final Price

Figure 19:
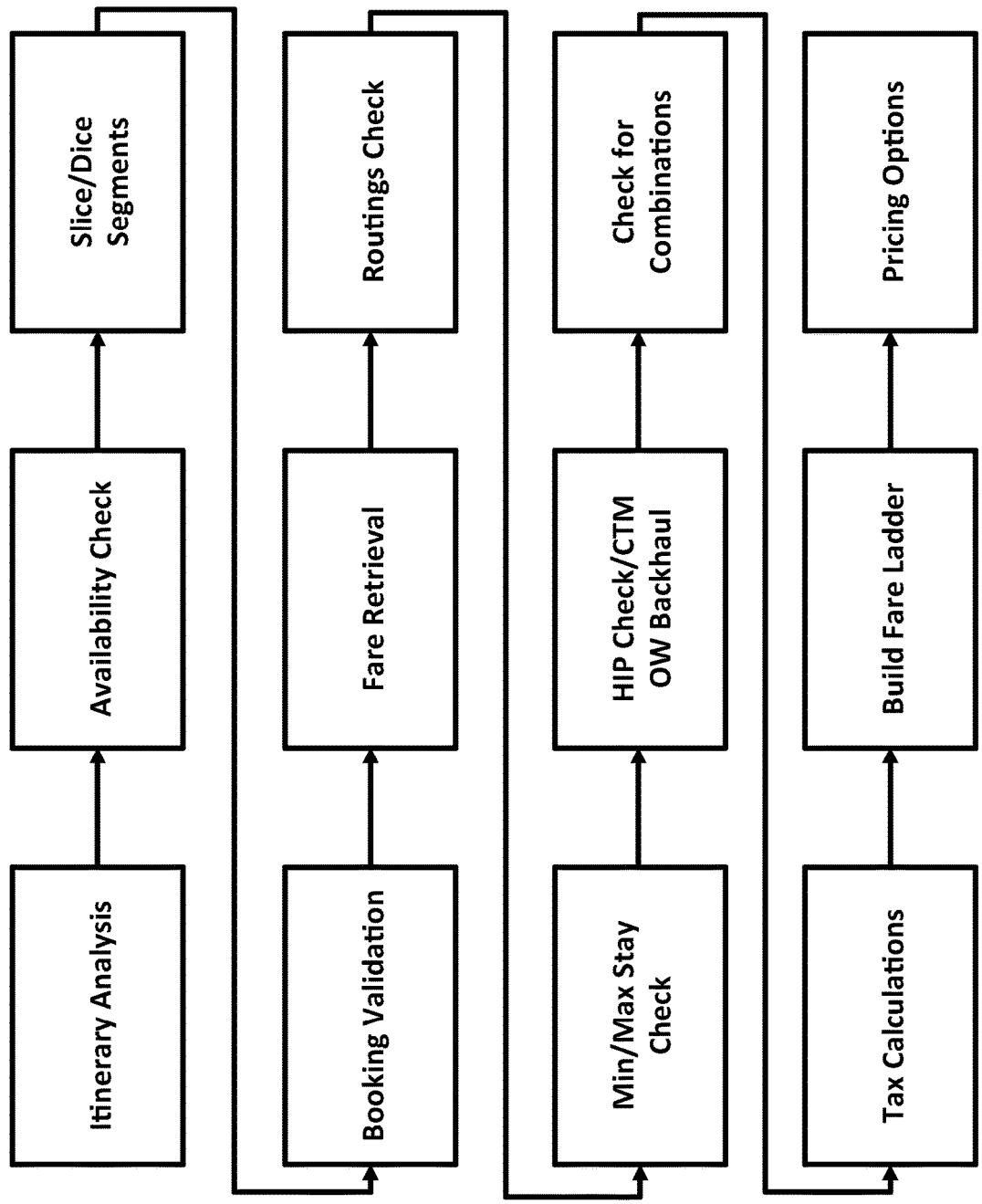
FIG. 19 shows an example of a process which provides fare pricing options.

An example of a process which provides fare pricing options is shown in FIG. 19.

Availability

Availability knowledge is very important in the industry. Availability allows airlines to control their inventory (seats) and it adds another way to manage how profitable a route is by opening up and closing availability buckets, which is managed by revenue management systems (RM).

While certain RMs have great functionality to manage complex rules, most of the availability rules are created by internal departments of statisticians and mathematicians, so the complexity is high.

There are three main ways to receive availability, if you want to check whether a certain seat/class of service is available.

i) NAVS/AVS

NAVS=simple, numeric availability per seat class.

Example: Y9 H3 M0 L8 . . .

AVS=availability status—is the flight open/closed, open for waitlist, etc.

ii) Polling

CXR (a carrier) could use NAVS/AVS only as an indication, if a better connection goes down. These CXR use revenue management rules and they need to be polled for real availability and all availability information.

Some airlines and/or flights require to be polled and the instruction for it is MR (market restrictions). When a GDS asks for AVA, if the tag is MR, then the GDS needs to poll for the right availability. Unfortunately, NAVS/AVS do not show these tags, so if a GDS uses NAVS/AVS for a tagged flight, they might display the wrong availability.

iii) Cache DB

In order to reduce polling and NAVS/AVS, pricing engines have developed complex cache DBs. These are not accurate, even though as they store info, they kind of achieve their goal of reduced calls.

Figure 20:
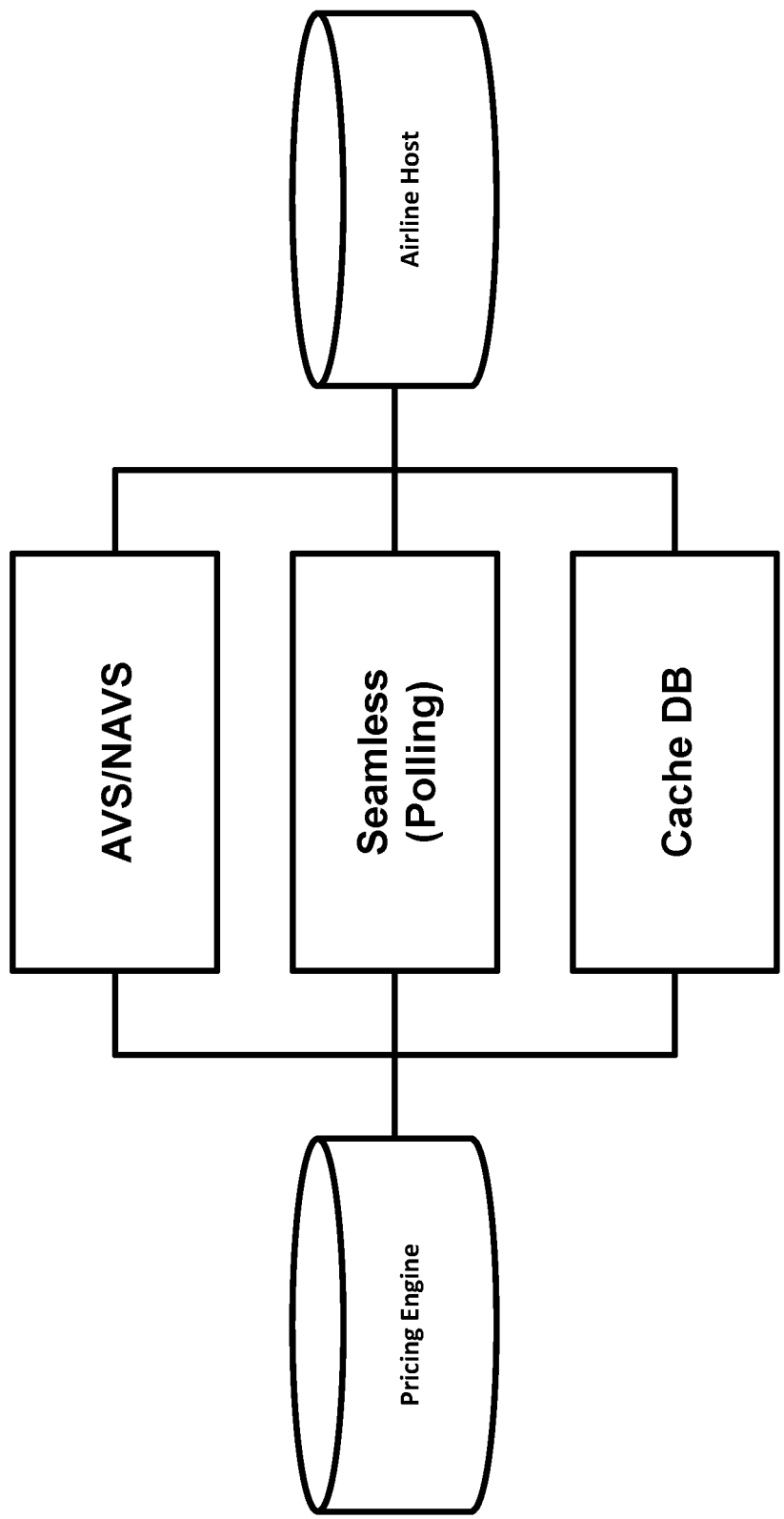
FIG. 20 shows an example of a relationship between a pricing engine, AVS/NAVS, Seamless (polling), a cache DB and an airline host.

An example of a relationship between a pricing engine, AVS/NAVS, Seamless (polling), a cache DB and an airline host is shown in FIG. 20.

Availability Server Example

Figure 21:
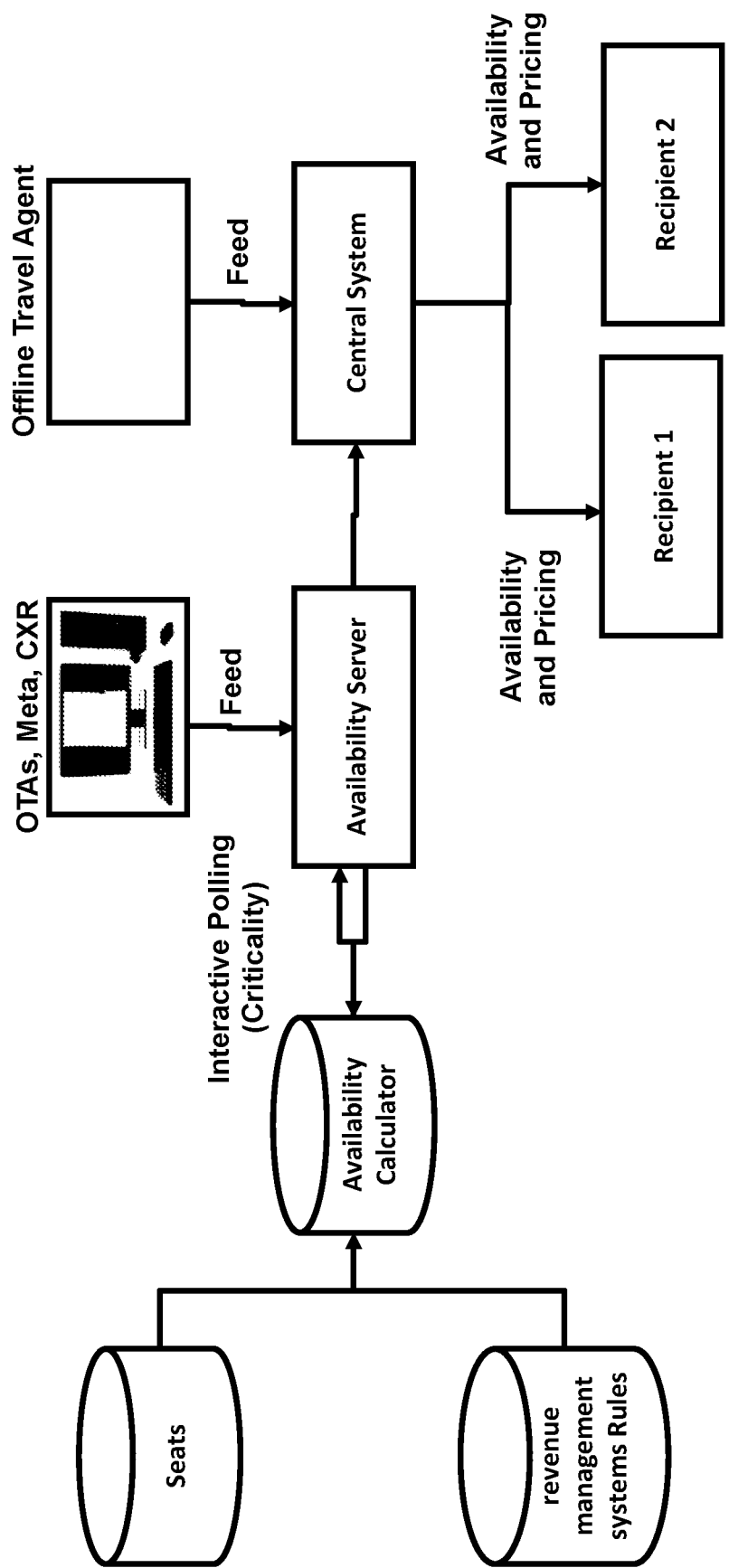
FIG. 21 shows an example system including an Availability Server.

A caching mechanism may be fed by offline traffic, but used by an online channel. An Availability Server may have the capability to update cached data based on rules (interactive polling) and flag any inconsistencies for booking. An example system including an Availability Server is shown in FIG. 21.

Note

The above-described steps can be implemented using standard well-known programming techniques. The novelty of the above-described embodiment lies not in the specific programming techniques but includes the use of the steps described to achieve the described results. Software programming code which embodies or forms part of the present invention is typically stored in permanent, non-transitory storage. In a client/server environment, such software programming code may be stored with storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the Figures support combinations of means for performing the specified functions, combinations of steps for performing the specified functions, and program instruction means for performing the specified functions.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

Concepts

There are multiple concepts, described as concepts 'A-J' below, included in this disclosure. The following may be helpful in defining these concepts. Aspects of the concepts may be combined.

A. Method of Providing Price Estimates

There is provided a method of providing price estimates, the method including the steps of:

(i) a computer server receiving a request for a price for goods or services, such as airfares, together with parameters defining those goods or services, (ii) configuring one or more processors to determine estimated prices from an incomplete historical price dataset by analysing patterns in that dataset, at any time with respect to step (i) above;

(iii) configuring one or more processors to calculate estimates for the requested price for the goods or services that satisfy the parameters; and (iv) providing the price estimates to an end-user computing device, such as a personal computer, smartphone or tablet.

The above may include additionally any of the following, alone or in combination:

the method, wherein the parameters defining those goods or services include one or more of the following: activity type, such as airfare, hotel booking, train fare; date range; destination; origin; desired weather conditions; star ratings; keywords; any other user defined preference.

determination of estimated prices is performed by inferring, deriving or predicting estimated prices.

step (ii) comprises: (a) obtaining historical price quotes from a computer data store; (b) grouping the historical price quotes by category; (c) deriving statistics for each group; (d) storing on a computer for each group a classifier including the derived statistics, and (e) identifying groups with stored classifiers to which the requested price corresponds.

step (iii) comprises: calculating a set of estimates for the requested price over the specified date range using statistics from the stored classifiers corresponding to the identified groups.

step (ii) includes using rules in order to analyse patterns in the dataset.

step (ii) includes a naïve Bayes classifier machine learning approach which produces a probabilistic model of prices, and that model is used to predict unobserved prices.

classifiers are trained using observed prices and sets of features that correspond to them.

the features relate to the request, and include one or more of: departure day of week, length of stay, stay Saturday, airline, time to travel, route, month.

a classifier then predicts the price of an unobserved price by being given a set of features and providing a most likely price to have those features.

features may be derived by training multiple models with different features and comparing the predictive accuracy of the different models.

step (ii) includes building a statistical model from historical prices, identifying missing quote candidates, and pricing quote candidates based on the statistical model.

estimating prices for each candidate quote occurs in the following steps: extracting category feature values from the quote; retrieving from a database a classifier trained for an extracted category; extracting all feature values from the quote candidate; classifying the candidate quote by calculating Bayes posterior probabilities for each price range stored in a classifier and choosing a price range class with a highest Bayes posterior probability, and attaching a price class to a candidate quote.

inputs for the statistical model include: list of routes, classifier categorization scheme, historical quotes, and a set of supported features with weights.

historical quotes are filtered by age.

inputs for the statistical model include reversed route equivalents.

the method including the step of: including cached fare prices in the set of price estimates.

the set of price estimates is constructed without querying a Distribution System after step (i).

the price is for a journey that is a one-way journey.

the price is for a journey that is a return journey.

the price includes an air fare price.

the price includes a train fare price.

the price includes a car hire price.

the price includes a hotel price.

the request comprises a flexible search request.

a final result of the method is up to one quote per input date or dates pair.

The method including the steps of: (A) configuring the one or more processors to determine confidence ranges of the estimated prices from an incomplete historical price dataset by analysing patterns in that dataset, at any time with respect to step (i), and (B) configuring the one or more processors to calculate confidence ranges of the estimated prices for the requested price for the goods or services that satisfy the parameters.

The method further comprising the step of: (C) providing the confidence ranges together with the fare price estimates to an end-user computing device, such as a personal computer, smartphone or tablet.

The method further comprising the step of: using the confidence ranges to decide whether to display a price to a user, or to provide a probable range of prices to a user.

the probable range of prices are displayed as error bars.

a date range includes only one outward date.

a date range includes only one return date.

the method including a method of providing a set of best return fare price estimates for a specified range of outward dates and a specified range of return dates, wherein: step (i) includes receiving a request for a return fare price for a specified range of outward dates and a specified range of return dates for a journey from a starting location to a destination location, and step (iv) includes providing the set of best return fare price estimates for the specified range of outward dates and for the specified range of return dates.

the set of best return fare price estimates are provided in a bar chart format.

an estimation process is parameterized by one or more of: a minimum Bayes posterior probability required to accept a classification result; a maximum number of route operators involved in candidates' generation, or a random variation added to Bayes posterior probability to avoid ties.

the method is performed on a server from which estimation services for fare availability and price are provided.

There is provided a server configured to provide price estimates, the server arranged to:

(i) receive a request for a price for goods or services, such as airfares, together with parameters defining those goods or services, including one or more of the following: activity type, such as airfare, hotel booking, train fare; date range; destination; origin; desired weather conditions; star ratings; keywords; any other user defined preference;

(ii) determine estimated prices from an incomplete historical price dataset by analysing patterns in that dataset, at any time with respect to (i) above;

(iii) calculate estimates for the requested price for the goods or services that satisfy the parameters and (iv) provide the price estimates.

The server may include additionally any of the following, alone or in combination:

(ii) the server is arranged to: obtain historical prices from a computer data store; group the historical prices by category; derive statistics for each group; store for each group a classifier including the derived statistics, and identify groups with stored classifiers to which the requested price corresponds.

the server is arranged to: calculate a set of estimates for the requested price over the specified date range using statistics from the stored classifiers corresponding to the identified groups.

The server is further arranged to perform a method of any of aspect of concept A.

There is provided a computer program product embodied on a non-transient storage medium, the computer program product when running on a computer arranged to provide price estimates, the computer program product when running on a computer arranged to:

(i) receive a request for a price for goods or services, such as airfares, together with parameters defining those goods or services, including one or more of the following: activity type, such as airfare, hotel booking, train fare; date range; destination; origin; desired weather conditions; star ratings; keywords; any other user defined preference;

(ii) determine estimated prices from an incomplete historical price dataset by analysing patterns in that dataset, at any time with respect to (i) above;

(iii) calculate estimates for the requested price for the goods or services that satisfy the parameters, and (iv) provide the price estimates.

The computer program product may be arranged to perform a method of any aspect of concept A.

There is provided a computer terminal in connection with a server of any server of concept A, the computer terminal arranged to send a request for a price estimate for a specified date range for a journey from a starting location to a destination location, wherein the computer terminal is further arranged to receive price estimates.

There is provided an item or a service, such as an airline ticket, and in which a price estimate for that item or service is provided using the method defined in any aspect of concept A, or a server defined in any aspect of concept A.

There is provided a web-based price comparison web site, with which end-users can interact by providing a request for a price for goods or services, and that web-based price comparison web site provides that request to a server that estimates the price(s) using the method of any aspect of concept A.

B. Method of Inferring which Fare Classes are Available for a Journey

Method of inferring which fare classes are available for a journey from a starting location to a destination location on a particular date, the method including the steps of:

(i) defining a request for fare prices for the journey from the starting location to the destination location on the particular date;

(ii) inferring, estimating or predicting estimated fare prices from an incomplete historical price dataset by analysing patterns in that dataset;

(iii) calculating estimates for the requested fare prices using the results of step (ii), (iv) sending the request to a Distribution System for fare prices for the journey from the starting location to the destination location on a particular date;

(v) receiving from the Distribution System the Distribution System's fare prices for the journey from the starting location to the destination location on the particular date;

(vi) comparing the calculated estimates for the requested fare prices from step (iii) with the Distribution System's fare prices received in step (v) so as to infer which fare classes are available for the journey from the starting location to the destination location on the particular date, and (vii) outputting the inferred fare class availability for the journey from the starting location to the destination location on the particular date.

The above may include additionally any of the following, alone or in combination:

the method, wherein step (ii) comprises:
  obtaining historical fare quotes from a computer data store;
  grouping the historical fare quotes by category;
  deriving statistics for each group;
  storing on a computer for each group a classifier including the derived statistics, and
  identifying groups with stored classifiers to which the requested fare prices correspond.

the method, wherein step (iii) comprises: calculating a set of estimates for the requested fare prices over the specified date range using statistics from the stored classifiers corresponding to the identified groups.

the Distribution System is a Global Distribution System.

an inferred fare class price is included with each inferred fare class availability.

including the step of sending the output to a server.

the server is an airline server.

step (ii) includes using rules in order to analyse patterns in the dataset.

step (ii) includes a naïve Bayes classifier machine learning approach which produces a probabilistic model of fares, and that model is used to predict unobserved fares.

classifiers are trained using observed prices and sets of features that correspond to them.

the features relate to the request, and include one or more of: departure day of week, length of stay, stay Saturday, airline, time to travel, route, month.

a classifier then predicts the price of an unobserved fare by being given a set of features and providing a most likely price to have those features.

features may be derived by training multiple models with different features and comparing the predictive accuracy of the different models.

step (ii) includes building a statistical model from historical prices, identifying missing quote candidates, and pricing quote candidates based on the statistical model.

estimating prices for each candidate quote occurs in the following steps: extracting category feature values from the quote; retrieving from a database a classifier trained for an extracted category; extracting all feature values from the quote candidate; classifying the candidate quote by calculating Bayes posterior probabilities for each price range stored in a classifier and choosing a price range class with a highest Bayes posterior probability, and attaching a price class to a candidate quote.

inputs for the statistical model include: list of routes, classifier categorization scheme, historical quotes, and a set of supported features with weights.

historical quotes are filtered by age.

inputs for the statistical model include reversed route equivalents.

the method including the step of: including cached fare prices in the set of fare price estimates.

the journey is a one-way journey.

the journey is a return journey.

the fare is an air fare.

the request comprises a flexible search request.

an estimation process is parameterized by one or more of: a minimum Bayes posterior probability required to accept a classification result; a maximum number of route operators involved in candidates' generation, or a random variation added to Bayes posterior probability to avoid ties.

the method is performed on a server from which estimation services for fare availability and price are provided.

There is further provided a server configured to infer which fare classes are available for a journey from a starting location to a destination location on a particular date, the server arranged to:

(i) define a request for fare prices for the journey from the starting location to the destination location on the particular date;

(ii) infer, estimate or predict estimated fare prices from an incomplete historical price dataset by analysing patterns in that dataset;

(iii) calculate estimates for the requested fare prices using the results of the estimated fares of (ii), (iv) send the request to a Distribution System for fare prices for the journey from the starting location to the destination location on a particular date;

(v) receive from the Distribution System the Distribution System's fare prices for the journey from the starting location to the destination location on the particular date;

(vi) compare the calculated estimates for the requested fare prices from the calculated estimates of (iii) with the Distribution System's fare prices received in (v) so as to infer which fare classes are available for the journey from the starting location to the destination location on the particular date, and (vii) output the inferred fare class availability for the journey from the starting location to the destination location on the particular date.

The server, wherein for (ii) the server is arranged to:

(a) obtain historical fare quotes from a computer data store;

(b) group the historical fare quotes by category;

(c) derive statistics for each group;

(d) store for each group a classifier including the derived statistics, and (e) identify groups with stored classifiers to which the requested fare price corresponds.

The server, wherein for (iii) the server is arranged to: calculate a set of estimates for the requested fare price over the specified date range using statistics from the stored classifiers corresponding to the identified groups.

The server, further arranged to perform a method including any of the above method limitations.

There is further provided a computer program product embodied on a non-transient storage medium, the computer program product when running on a computer arranged to infer which fare classes are available for a journey from a starting location to a destination location on a particular date, the computer program product when running on a computer arranged to:

(i) define a request for fare prices for the journey from the starting location to the destination location on the particular date;

(ii) infer, estimate or predict estimated fare prices from an incomplete historical price dataset by analysing patterns in that dataset;

(iii) calculate estimates for the requested fare prices using the results of the estimated fares of (ii), (iv) send the request to a Distribution System for fare prices for the journey from the starting location to the destination location on a particular date;

(v) receive from the Distribution System the Distribution System's fare prices for the journey from the starting location to the destination location on the particular date;

(vi) compare the calculated estimates for the requested fare prices from the calculated estimates of (iii) with the Distribution System's fare prices received in (v) so as to infer which fare classes are available for the journey from the starting location to the destination location on the particular date, and (vii) output the inferred fare class availability for the journey from the starting location to the destination location on the particular date.

The computer program product, arranged to perform a method according any of the above method limitations.

There is provided a computer in connection with a server of any of the above server concepts of Concept B, the computer arranged to send a request defining the journey from the starting location to the destination location on the particular date, wherein the computer is further arranged to receive the outputted inferred fare class availability for the journey from the starting location to the destination location on the particular date.

C. Method of Estimating a Fare Price

A method of estimating a fare price, the method including the steps of:

(i) obtaining historical fare quotes from a computer data store;

(ii) grouping the historical fare quotes by category;

(iii) deriving statistics for each group;
(iv) storing on a computer for each group a classifier including the derived statistics;
(v) receiving a request for a fare price for a journey from a starting location to a destination location on a particular date;
(vi) identifying groups with stored classifiers to which the requested fare price corresponds,
(vii) calculating an estimate for the requested fare price using statistics from the stored classifiers corresponding to the identified groups, and
(viii) providing the requested fare price estimate.

D. Method of Estimating a Fare Price

A method of estimating a fare price, the method including the steps of:
(i) receiving a request for a fare price for a journey from a starting location to a destination location on a particular date;
(ii) inferring, estimating or predicting estimated fares from an incomplete historical price dataset by analysing patterns in that dataset;
(iii) calculating an estimate for the requested fare price using the results of step (ii), and
(iv) providing the requested fare price estimate.

E. Method of Providing a Set of Return Fare Price Estimates

A method of providing a set of return fare price estimates, the method including the steps of:
(i) obtaining historical fare quotes from a computer data store;
(ii) grouping the historical fare quotes by category;
(iii) deriving statistics for each group;
(iv) storing on a computer for each group a classifier including the derived statistics;
(v) receiving a request for a return fare price for a specified outward date and a specified return date for a journey from a starting location to a destination location;
(vi) identifying groups with stored classifiers to which the requested return fare price corresponds,
(vii) calculating a set of estimates for the requested return fare price for the specified outward and return dates using statistics from the stored classifiers corresponding to the identified groups, and
(viii) providing the set of fare price estimates.

F. Method of Providing a Set of Best Return Fare Price Estimates

A method of providing a set of best return fare price estimates for a specified range of outward dates and a specified range of return dates, the method including the steps of:
(i) obtaining historical fare quotes from a computer data store;
(ii) grouping the historical fare quotes by category;
(iii) deriving statistics for each group;
(iv) storing on a computer for each group a classifier including the derived statistics;
(v) receiving a request for a return fare price for a specified range of outward dates and a specified range of return dates for a journey from a starting location to a destination location;
(vi) identifying groups with stored classifiers to which the requested return fare price corresponds,
(vii) calculating a set of estimates for the requested return fare price for pairs of outward and return dates using statistics from the stored classifiers corresponding to the identified groups,
(viii) selecting a best fare price estimate for each pair of outward and return dates, and
(ix) providing the set of best return fare price estimates for each pair of outward and return dates.

G. Method of Providing a Set of Return Fare Price Estimates

A method of providing a set of return fare price estimates, the method including the steps of:
(i) receiving a request for a return fare price for a specified outward date and a specified return date for a journey from a starting location to a destination location;
(ii) inferring, estimating or predicting estimated fares from an incomplete historical price dataset by analysing patterns in that dataset;
(iii) calculating a set of estimates for the requested return fare price for the specified outward and return dates using the results of step (ii), and
(iv) providing the set of fare price estimates.

H. Method of Providing a Set of Best Return Fare Price Estimates

A method of providing a set of best return fare price estimates for a specified range of outward dates and a specified range of return dates, the method including the steps of:
(i) receiving a request for a return fare price for a specified range of outward dates and a specified range of return dates for a journey from a starting location to a destination location;
(ii) inferring, estimating or predicting estimated fares from an incomplete historical price dataset by analysing patterns in that dataset;
(iii) calculating a set of estimates for the requested return fare price for pairs of outward and return dates using the results of step (ii), and
(iv) providing the set of best return fare price estimates for each pair of outward and return dates.

I. Method of Inferring which Fare Classes are Available

There is provided a method of inferring which fare classes are available, the method including the steps of:
(i) a computer server receiving a request for a price for goods or services, such as airfares, together with parameters defining those goods or services,
(ii) configuring one or more processors to determine estimated prices from an incomplete historical price dataset by analysing patterns in that dataset, at any time with respect to step (i) above;
(iii) configuring one or more processors to calculate estimates for the requested price for the goods or services that satisfy the parameters;
(iv) sending the request to a Distribution System for fare prices;
(v) receiving from the Distribution System the Distribution System's fare prices;
(vi) comparing the calculated estimates for the requested price from step (iii) with the Distribution System's fare prices received in step (v) so as to infer fare class availability, and
(vii) providing the inferred fare class availability to a computing device.

The above may include additionally any of the following, alone or in combination:
  the parameters defining those goods or services include one or more of the following: activity type, such as airfare, hotel booking, train fare; date range; destination; origin; desired weather conditions; star ratings; keywords; any other user defined preference.
  determination of estimated prices is performed by inferring, deriving or predicting estimated prices.

step (ii) comprises:
a) obtaining historical price quotes from a computer data store;
b) grouping the historical price quotes by category;
c) deriving statistics for each group;
d) storing on a computer for each group a classifier including the derived statistics, and
e) identifying groups with stored classifiers to which the requested prices corresponds.

step (iii) comprises: calculating a set of estimates for the requested price over a specified date range using statistics from the stored classifiers corresponding to the identified groups.

the Distribution System is a Global Distribution System.

an inferred fare class price is included with each inferred fare class availability.

step (vii) includes sending the inferred fare class availability to a server.

the server is an airline server.

step (ii) includes using rules in order to analyse patterns in the dataset.

step (ii) includes a naïve Bayes classifier machine learning approach which produces a probabilistic model of prices, and that model is used to predict unobserved prices.

classifiers are trained using observed prices and sets of features that correspond to them.

the features relate to the request, and include one or more of: departure day of week, length of stay, stay Saturday, airline, time to travel, route, month.

a classifier then predicts the price of an unobserved price by being given a set of features and providing a most likely price to have those features.

features may be derived by training multiple models with different features and comparing the predictive accuracy of the different models.

step (ii) includes building a statistical model from historical prices, identifying missing quote candidates, and pricing quote candidates based on the statistical model.

estimating prices for each candidate quote occurs in the following steps: extracting category feature values from the quote; retrieving from a database a classifier trained for an extracted category; extracting all feature values from the quote candidate; classifying the candidate quote by calculating Bayes posterior probabilities for each price range stored in a classifier and choosing a price range class with a highest Bayes posterior probability, and attaching a price class to a candidate quote.

inputs for the statistical model include: list of routes, classifier categorization scheme, historical quotes, and a set of supported features with weights.

historical quotes are filtered by age.

inputs for the statistical model include reversed route equivalents.

the method including the step of: including cached fare prices in the set of price estimates.

the price is for a journey that is a one-way journey.
the price is for a journey that is a return journey.
the price includes an air fare price.
the price includes a train fare price.
the price includes a car hire price.
the price includes a hotel price.
the request comprises a flexible search request.
an estimation process is parameterized by one or more of:
a minimum Bayes posterior probability required to accept a classification result; a maximum number of route operators involved in candidates' generation, or a random variation added to Bayes posterior probability to avoid ties.

the method is performed on a server from which estimation services for fare availability and price are provided.

There is further provided a server configured to perform a method of any of the above statements.

There is further provided a server configured to infer which fare classes are available, the server arranged to:
(i) receive a request for a price for goods or services, such as airfares, together with parameters defining those goods or services,
(ii) configure one or more processors to determine estimated prices from an incomplete historical price dataset by analysing patterns in that dataset, at any time with respect to (i) above;
(iii) configure one or more processors to calculate estimates for the requested price for the goods or services that satisfy the parameters;
(iv) send the request to a Distribution System for fare prices;
(v) receive from the Distribution System the Distribution System's fare prices;
(vi) compare the calculated estimates for the requested price from (iii) with the Distribution System's fare prices received in (v) so as to infer fare class availability, and
(vii) provide the inferred fare class availability to a computing device.

The above may include additionally any of the following, alone or in combination:
the parameters defining those goods or services include one or more of the following: activity type, such as airfare, hotel booking, train fare; date range; destination; origin; desired weather conditions; star ratings; keywords; any other user defined preference.

determination of estimated prices is performed by inferring, deriving or predicting estimated prices.

for (ii) the server is arranged to:
obtain historical price quotes from a computer data store;
group the historical price quotes by category;
derive statistics for each group;
store for each group a classifier including the derived statistics, and
identify groups with stored classifiers to which the requested prices correspond.

for (iii) the server is arranged to: calculate a set of estimates for the requested price over the specified date range using statistics from the stored classifiers corresponding to the identified groups.

The server is further arranged to perform a method of any of aspect of the above method.

There is provided a computer program product embodied on a non-transient storage medium, the computer program product when running on a computer arranged to infer which fare classes are available, the computer program product when running on a computer arranged to:
(i) receive a request for a price for goods or services, such as airfares, together with parameters defining those goods or services,
(ii) configure one or more processors to determine estimated prices from an incomplete historical price dataset by analysing patterns in that dataset, at any time with respect to step (i) above;

(iii) configure one or more processors to calculate estimates for the requested price for the goods or services that satisfy the parameters;

(iv) send the request to a Distribution System for fare prices;

(v) receive from the Distribution System the Distribution System's fare prices;

(vi) compare the calculated estimates for the requested price from step (iii) with the Distribution System's fare prices received in step (v) so as to infer fare class availability, and (vii) provide the inferred fare class availability to a computing device.

The computer program product may be arranged to perform a method according to any aspect of the above method.

There is provided a computer terminal in connection with a server of any of aspect of the above server, the computer terminal arranged to send a request defining a request for fare class availability for goods or services, such as airfares, together with parameters defining those goods or services, wherein the computer is further arranged to receive the outputted inferred fare class availability.

There is provided an item or a service, such as an airline ticket, and in which a fare class availability for that item or service is provided using the method defined in any of aspect of the above method or the server in any aspect of the above server.

There is provided a web-based price comparison web site, with which end-users can interact by providing a request for fare class availability, and that web-based price comparison web site provides that request to a server that estimates the fare class availability using the method of any aspect of the above method.

J. A Method of Inferring Fare Class Availability for a Specific Flight or Flights There is provided a method of inferring fare class availability for a specific flight or flights by:

(a) receiving observable, live bookable prices for that flight(s), in which that price information is not accompanied by complete fare class information for those flight(s);

(b) comparing the observable, live bookable prices with a set of prices calculated from stored data, such as valid itinerary data, fare data such as FROP data, and tax/surcharge data; and (c) determining which fare class was used in the observable live bookable price by determining which fare class was used in the calculated price that matches most closely to the observable live bookable price.

The above may include additionally any of the following, alone or in combination:

the stored data can be from cached, previously obtained live, bookable prices.

a fare class defines some or all of the applicable rules or restrictions applying to a specific fare for a specific flight or flights and include one or more of: class code, such as C (business full fare) or Y (economy full fare), fare type, such as first class or economy; categories, such as eligibility, minimum stay, stopovers, or penalties.

an inferred fare class price is included with each inferred fare class availability.

step (c) includes sending the inferred fare class availability to a server.

the server is an airline server.

step (b) includes using rules in order to analyse patterns in the set of prices calculated from stored data.

calculating the set of prices calculated from stored data in step (b) includes building a statistical model from historical prices, identifying missing quote candidates, and pricing quote candidates based on the statistical model.

inputs for the statistical model include reversed route equivalents.

There is further provided a server configured to perform the method of any of the above statements.

There is further provided a computer program product embodied on a non-transient storage medium, the computer program product when running on a computer arranged to infer fare class availability for a specific flight or flights, the computer program product when running on a computer arranged to:

(a) receive observable, live bookable prices for that flight(s), in which that price information is not accompanied by complete fare class information for those flight(s);

(b) compare the observable, live bookable prices with a set of prices calculated from stored data, such as valid itinerary data, fare data such as FROP data, and tax/surcharge data; and (c) determine which fare class was used in the observable live bookable price by determining which fare class was used in the calculated price that matches most closely to the observable live bookable price.

There is provided a computer terminal in connection with a server of any of aspect of the above server, the computer terminal arranged to send a request defining a request for fare class availability for goods or services, such as airfares, together with parameters defining those goods or services, wherein the computer is further arranged to receive the outputted inferred fare class availability.

There is provided an item or a service, such as an airline ticket, and in which a fare class availability for that item or service is provided using the method defined in any of aspect of the above method or the server in any aspect of the above server.

There is provided a web-based price comparison web site, with which end-users can interact by providing a request for fare class availability, and that web-based price comparison web site provides that request to a server that estimates the fare class availability using the method of any aspect of the above method.

The invention claimed is:

1. A computer-implemented method of reducing data storage requirements, and of inferring which airfare classes are available, the method including the steps of:

(i) receiving observable, live bookable prices for flights, including price information, wherein the price information does not include complete fare class information for those flights;

(ii) storing the received observable, live bookable prices for the flights, including the price information, in a computer data store embodied on a non-transitory storage medium, to provide a stored incomplete historical travel-related price dataset which does not include complete fare class information for the stored received observable, live bookable prices for the flights including the price information, wherein the stored incomplete historical travel-related price dataset uses a smaller data storage capacity than a complete historical travel-related price dataset;

(iii) a computer server receiving a request for a price for airfares, together with parameters defining those airfares, the server responsive to at least 66,795 different requests for prices for airfares;

(iv) configuring one or more processors to determine estimated prices from the incomplete historical price dataset in the computer data store embodied on the non-transitory storage medium by analysing statistical patterns in that dataset, at any time with respect to step (iii) above, wherein this step comprises
   (a) obtaining historical price quotes from the incomplete historical travel-related price dataset stored in the computer data store embodied on the non-transitory storage medium;
   (b) grouping the historical price quotes by category;
   (c) deriving statistics for each group;
   (d) storing on a computer for each group a classifier including the derived statistics; and
   (e) identifying groups with stored classifiers to which the requested prices correspond;
(v) configuring one or more processors to calculate estimates for the requested price for the airfares that satisfy the parameters, and calculating estimates for the requested price for the airfares that satisfy the parameters, including using the stored classifiers corresponding to the identified groups;
(vi) sending the request to a Distribution System for airfare prices;
(vii) receiving from the Distribution System the Distribution System's airfare prices;
(viii) comparing the calculated estimates for the requested price from step (v) with the Distribution System's airfare prices received in step (vii) to infer airfare class availability, and
(ix) the computer server providing the inferred airfare class availability to a computing device, and the computing device storing the inferred airfare class availability.

2. The method of claim 1, wherein the parameters defining those airfares include one or more of the following: date range; destination; origin; desired weather conditions; star ratings; keywords.

3. The method of claim 1, wherein determination of estimated prices is performed by inferring, deriving or predicting estimated prices.

4. The method of claim 1, wherein step (v) comprises: calculating a set of estimates for the requested price over a specified date range using statistics from the stored classifiers corresponding to the identified groups.

5. The method of claim 1, wherein the Distribution System is a Global Distribution System.

6. The method of claim 1, wherein an inferred airfare class price is included with each inferred airfare class availability.

7. The method of claim 1, wherein step (ix) includes sending the inferred airfare class availability to a server.

8. The method of claim 1, wherein step (iv) includes using rules in order to analyse the statistical patterns in the dataset.

9. The method of claim 1, wherein step (iv) includes using a naive Bayes classifier machine learning approach which produces a probabilistic model of prices, and that model is used to predict unobserved prices.

10. Method of claim 1, wherein step (ii) includes building a statistical model from historical prices, identifying missing quote candidates, and pricing quote candidates based on the statistical model.

11. The method of claim 1, the method including the step of: including cached fare prices in the set of price estimates.

12. The method of claim 1, wherein the price includes a train fare price, or wherein the price includes a car hire price, or wherein the price includes a hotel price.

13. The method of claim 9, wherein classifiers are trained using observed prices and sets of features that correspond to them.

14. The method of claim 13, wherein the features relate to the request, and include one or more of: departure day of week, length of stay, stay Saturday, airline, time to travel, route, month.

15. The method of claim 14, wherein a classifier is used to predict the price of an unobserved price by receiving a set of features and providing a most likely price to have those features.

16. The method of claim 13, wherein features are derived by training multiple models with different features and comparing the predictive accuracy of the different models.

17. The method of claim 10, wherein estimating prices for each candidate quote includes in the following steps: extracting category feature values from the quote; retrieving from a database a classifier trained for an extracted category; extracting all feature values from the quote candidate; classifying the candidate quote by calculating Bayes posterior probabilities for each price range stored in a classifier and choosing a price range class with a highest Bayes posterior probability, and attaching a price class to a candidate quote.

18. The method of claim 10, wherein inputs for the statistical model include: list of routes, classifier categorization scheme, historical quotes, and a set of supported features with weights.

19. The method of claim 1, wherein the request comprises a flexible search request.

20. A system including a server, a storage computer, a computing device and a computer data store embodied on a non-transitory storage medium, the server configured to infer which airfare classes are available, the server configured to:
   (i) receive observable, live bookable prices for flights, including price information, wherein the price information does not include complete fare class information for those flights;
   (ii) store the received observable, live bookable prices for the flights, including the price information, in the computer data store embodied on the non-transitory storage medium, to provide a stored incomplete historical travel-related price dataset which does not include complete fare class information for the stored received observable, live bookable prices for the flights including the price information, wherein the stored incomplete historical travel-related price dataset uses a smaller data storage capacity than a complete historical travel-related price dataset;
   (iii) receive a request for a requested price for airfares, together with parameters defining those airfares, and to respond to at least 66,795 different requests for prices for airfares;
   (iv) configure one or more processors to determine estimated prices from the incomplete historical price dataset stored in the computer data store by analysing statistical patterns in that dataset, at any time with respect to (iii) above, wherein the configuring comprises:
      (a) obtaining historical price quotes from the incomplete historical travel-related price dataset stored in the computer data store embodied on the non-transitory storage medium;
      (b) grouping the historical price quotes by category;
      (c) deriving statistics for each group;

(d) storing on the storage computer for each group a classifier including the derived statistics, and
(e) identifying groups with stored classifiers to which the requested prices correspond;
(v) configure one or more processors to calculate estimates for the requested price for the airfares that satisfy the parameters, and calculate estimates for the requested price for the airfares that satisfy the parameters, including using the stored classifiers corresponding to the identified groups;
(vi) send the request to a Distribution System for airfare prices;
(vii) receive from the Distribution System the Distribution System's airfare prices;
(viii) compare the calculated estimates for the requested price from (v) with the Distribution System's airfare prices received in (vii), to infer airfare class availability, and
(ix) provide the inferred airfare class availability to the computing device, wherein the computing device stores the inferred airfare class availability.

* * * * *